(12) United States Patent
Thiel et al.

(10) Patent No.: US 11,306,582 B2
(45) Date of Patent: Apr. 19, 2022

(54) METHODS AND SYSTEMS EMPLOYING LOOK-AROUND AND LOOK-AHEAD INVERSION OF DOWNHOLE MEASUREMENTS

(71) Applicant: SCHLUMBERGER TECHNOLOGY CORPORATION, Sugar Land, TX (US)

(72) Inventors: Michael Thiel, Cambridge, MA (US); Dzevat Omeragic, Lexington, MA (US); Andrei Davydychev, Sugar Land, TX (US); Tarek M. Habashy, Burlington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/099,980

(22) PCT Filed: May 8, 2017

(86) PCT No.: PCT/US2017/031490
§ 371 (c)(1),
(2) Date: Nov. 8, 2018

(87) PCT Pub. No.: WO2017/196696
PCT Pub. Date: Nov. 16, 2017

(65) Prior Publication Data
US 2019/0128116 A1    May 2, 2019

Related U.S. Application Data

(60) Provisional application No. 62/333,232, filed on May 8, 2016.

(51) Int. Cl.
*G01V 3/26* (2006.01)
*G01V 3/38* (2006.01)
(Continued)

(52) U.S. Cl.
CPC ............. *E21B 47/125* (2020.05); *G01V 3/26* (2013.01); *G01V 3/30* (2013.01); *G01V 3/38* (2013.01)

(58) Field of Classification Search
None
See application file for complete search history.

(56) References Cited

U.S. PATENT DOCUMENTS

| 6,594,584 B1 | 7/2003 | Omeragic et al. |
| 6,819,110 B2 | 11/2004 | Omeragic et al. |

(Continued)

FOREIGN PATENT DOCUMENTS

WO    9307514 A1    4/1993

OTHER PUBLICATIONS

Moghaddamjoo, A., "Constraint Optimum Well-Log Signal Segmentation," IEEE Transactions on Geoscience and Remote Sensing, 1989, 27(5), pp. 633-641.

(Continued)

*Primary Examiner* — Curtis A Kuntz
*Assistant Examiner* — Jerold B Murphy
(74) *Attorney, Agent, or Firm* — Trevor G. Grove

(57) ABSTRACT

Inversion-based workflows are provided for real-time interpretation of the electromagnetic (EM) look-around and look-ahead measurements. The profile of a look-around zone is determined by interpreting EM measurements of a look-around zone. The profile of the look-around zone characterizes formation dip as well as vertical resistivity or resistivity anisotropy of one or more formation layers of the look-around zone. The profile of a look-ahead zone is determined by interpreting EM measurements of the look-ahead zone. The profile of the look-ahead zone characterizes formation dip as well as horizontal resistivity, vertical resistivity or anisotropy of one or more formation layers of the (Continued)

look-ahead zone. The workflows can also involve interpretation of look-around resistivity measurements to aid in the characterization of the look-around zone.

33 Claims, 29 Drawing Sheets

(51) Int. Cl.
  *E21B 47/125* (2012.01)
  *G01V 3/30* (2006.01)

(56) References Cited

U.S. PATENT DOCUMENTS

| | | | |
|---|---|---|---|
| 7,755,361 B2 | 7/2010 | Seydoux et al. | |
| 8,433,518 B2 | 4/2013 | Omeragic et al. | |
| 8,497,673 B2 | 7/2013 | Wang et al. | |
| 8,736,270 B2 | 5/2014 | Seydoux et al. | |
| 8,862,405 B2 | 10/2014 | Seydoux et al. | |
| 9,134,449 B2 | 9/2015 | Seydoux et al. | |
| 10,036,826 B2 | 7/2018 | Thiel et al. | |
| 10,073,189 B2 | 9/2018 | Davydychev et al. | |
| 10,197,699 B2* | 2/2019 | Donderici | G01S 13/89 |
| 2008/0296064 A1* | 12/2008 | Al Hadhrami | E21B 47/022 |
| | | | 175/45 |
| 2012/0298420 A1* | 11/2012 | Seydoux | E21B 47/02 |
| | | | 175/26 |
| 2014/0249754 A1 | 9/2014 | Donderici et al. | |
| 2015/0015265 A1 | 1/2015 | Seydoux et al. | |
| 2015/0035536 A1* | 2/2015 | Tang | G01V 3/20 |
| | | | 324/339 |
| 2015/0300150 A1 | 10/2015 | Burkay | |
| 2015/0301222 A1 | 10/2015 | Davydychev et al. | |
| 2016/0258273 A1* | 9/2016 | Hou | E21B 47/022 |
| 2017/0306701 A1* | 10/2017 | Wu | E21B 7/04 |

OTHER PUBLICATIONS

Sun, K. et al., "Evaluation of Resistivity Anisotropy and Formation Dip from Directional Electromagnetic Tools While Drilling," presented at the 51st SPWLA Annual Symposium, Perth, Australia, 2010, 16 pages.

* cited by examiner

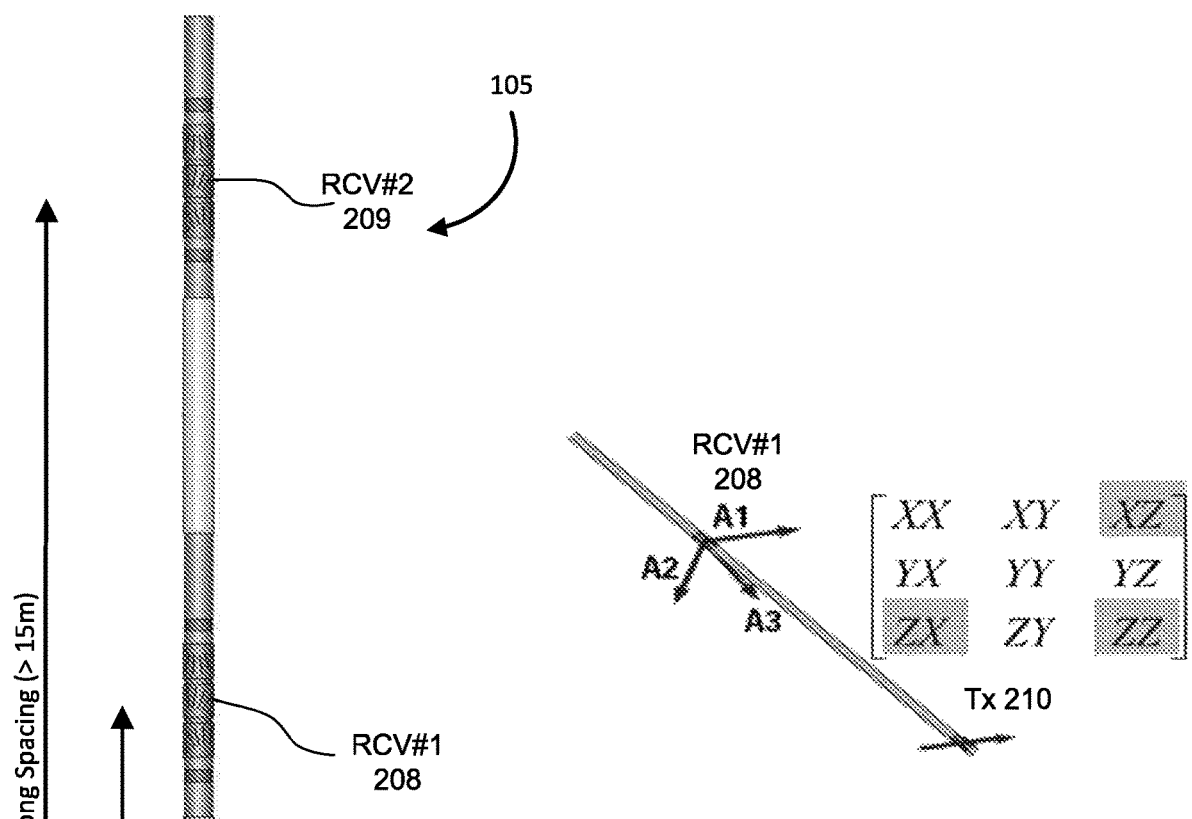
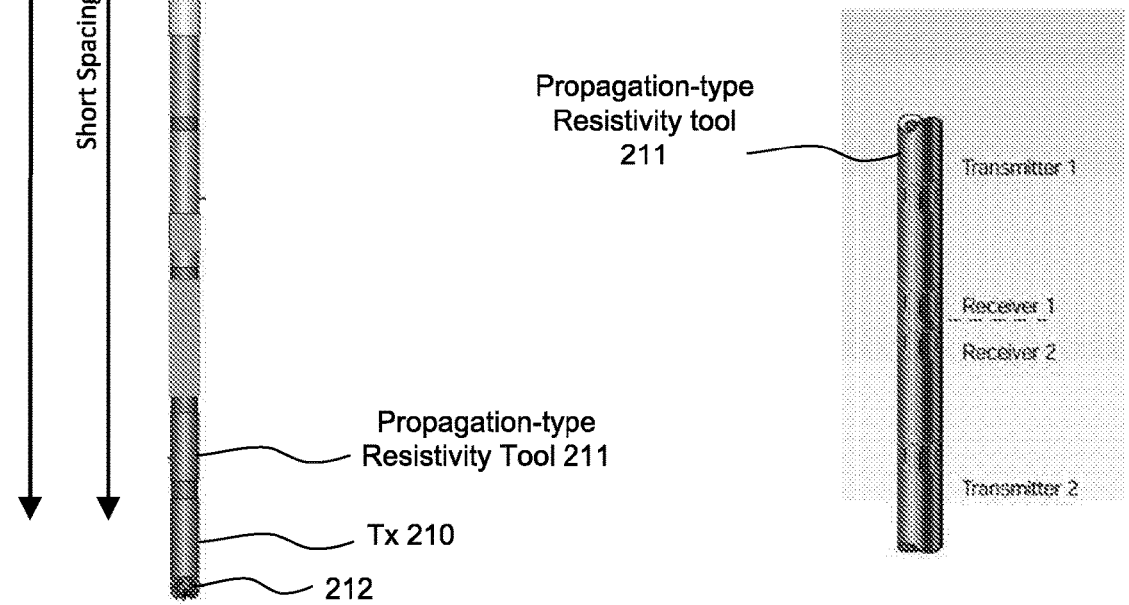
FIG. 2A
FIG. 2B
FIG. 2E

| Dip in ° | Rcox/Rh for Rv/Rh = 2.0 | Rcox/Rh for Rv/Rh = 5.0 |
|---|---|---|
| 0 | 1.00 | 1.00 |
| 10 | 1.00 | 1.01 |
| 20 | 1.03 | 1.05 |
| 30 | 1.07 | 1.13 |
| 40 | 1.13 | 1.25 |
| 50 | 1.21 | 1.46 |
| 60 | 1.31 | 1.79 |

FIG. 8

METHODS AND SYSTEMS EMPLOYING LOOK-AROUND AND LOOK-AHEAD INVERSION OF DOWNHOLE MEASUREMENTS

CROSS-REFERENCE TO RELATED APPLICATIONS

This disclosure claims priority from U.S. Provisional Patent Appl. No. 62/333,232, field on May 8, 2016, herein incorporated by reference in its entirety.

BACKGROUND

1. Field

This disclosure relates generally to oil and gas well logging and directional drilling. More specifically, techniques are disclosed for enhancing well placement using logging-while-drilling (LWD) tool data.

2. State of the Art

Wellbores are drilled through earth formations to extract petroleum or other hydrocarbon-based resources. Data on downhole conditions and movement of the drilling assembly can be collected during the drilling process. By collecting and processing such information during the drilling process, the driller can modify or correct key steps of the operation to optimize well placement. Schemes for collecting data of downhole conditions and movement of the drilling assembly during the drilling operation are commonly referred to as measurement-while-drilling ("MWD"). Similar techniques focusing more on the measurement of formation parameters during the drilling process are commonly referred to as logging-while-drilling ("LWD"). However, the terms MWD and LWD are often used interchangeably, and the use of either term in this disclosure will be understood to include both the collection of formation and borehole information as well as data on movement and placement of the drilling assembly.

Electromagnetic (EM) LWD tools have been employed in oilfield applications for many years. These types of logging tools or instruments usually include an elongated support equipped with antennas that are operable as sources (transmitters) or sensors (receivers). The antennas on these tools are generally formed as loops or coils of conductive wires, and may be configured to have dipole moments that are axial (parallel with tool axis), transverse (perpendicular to the tool axis), or tilted (neither parallel nor perpendicular to the tool axis). In operation, one or more transmitter antenna is energized by an alternating current to emit EM energy into the surrounding formation or formations. As used herein, "formation" may refer to a single layer or may include multiple layers. The emitted energy interacts with the borehole and formation to produce signals that are detected and measured by one or more receiver antennas. These detected signals reflect the interactions with the formation. By processing the detected signal data, a log or profile of the formation and/or borehole properties can be determined.

The introduction of directional electromagnetic (EM) logging tools has revolutionized wellbore placement. Specifically, the directional EM measurements enable proactive geo-steering and geo-stopping, which allows control over the trajectory of the drilled wellbore such that it is maintained within the reservoir of interest or "pay zone." As a result, the trajectory of the drilled wellbore can be steered and stopped along a path defined by observed reservoir boundaries and fluid contacts rather than by preconceived geometries. Data from the LWD or MWD tools are used for real-time prediction and visualization of the layer structure of the formation surrounding the tool or drill string. Such real-time visualization allows operators to control the direction of the wellbore drilling operations in order to place or "land" the wellbore in a particular section and location of a reservoir. Wellbore placement optimization results in increased production by optimizing the well landing, minimizing gas or water breakthrough, reducing side tracks, and managing drilling risk through better control of the wellbore placement.

Directional EM LWD tools are well suited for these applications because of their relatively large lateral depth of investigation into the surrounding formation and azimuthal sensitivity. A number of directional EM LWD tools are commercially available, such as Schlumberger's PeriScope™ and GeoSphere™ deep imaging LWD tools, which incorporate multiple axial, tilted and transverse antennas in the drilling collar in case of the PeriScope™ LWD tool and multiple tilted antenna subs in case of the GeoSphere™ LWD tool. The non-axial antennae generate directional measurements that are used to determine distances to nearby boundaries and azimuthal orientation of formation boundaries in various mud types. These measurements are transmitted up-hole while-drilling, processed in real-time through the inversion and results displayed on a graphical interface (visualized) to provide information on distance to boundaries, formation resistivity and orientation. These EM LWD tools also include short antenna spacings with shallow depths of investigation (DOI), used to characterize the formation layers near the tool as well as longer antenna spacings with deep DOIs, used to image and characterize properties of formation layers farther away from the tool.

U.S. Pat. No. 6,819,110 describes an exemplary directional EM LWD tool that employs a combination of axial and transverse magnetic dipole induction couplings for two or three antenna arrays to maximize the contribution ahead of the bit based on spatial sensitivities.

U.S. Pat. No. 8,736,270 describe a workflow for determining a formation property ahead of a drill bit using a directional EM LWD tool that involves inversion of a look-around measurement followed by inversion of a look-ahead measurement. The inversion of the look-ahead measurement determines the formation feature ahead of the drill bit.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure provides methods (and corresponding systems) that drill a wellbore that traverses a geological formation using one more LWD tools together with formation modeling and inversion based on measurements of the one or more LWD tools.

In one or more embodiments, the wellbore is drilled with a propagation-type resistivity tool close to a drilling bit and a directional EM tool with a tilted transmitter near the drilling bit. A look-around zone of the formation can be characterized by a multistep look-around processing workflow that includes i) inversion operations (referred to herein as "first inversion look-around processing") that interpret resistivity measurements of the propagation-type resistivity tool to determine a profile of the horizontal resistivity Rh for one or more formation layers of the look-around zone, and ii) inversion operations (referred to herein as "second inversion look-around processing") that interpret EM measurements of the directional EM tool to determine formation dip and a profile of the vertical resistivity Rv or resistivity anisotropy of one or more formation layers of the look-around zone. The profile of the horizontal resistivity Rh of one or more formation layers of the look-around zone as determined from the first inversion look around processing, the formation dip and the profile of the vertical resistivity Rv or resistivity anisotropy of one or more formation layers of the look-around zone as determined from the second inversion look around processing (and possibly data characterizing other features or properties of the one or more formation layers of the look-around zone as determined from the first and/or second inversion look around processing) can be a part of a more-complete profile of the look-around zone.

The resultant profile of the look-around zone as determined from the multistep look-around processing workflow can be used to update a reservoir model or part thereof that corresponds to the look-around zone for visualization and reservoir analysis and/or reservoir characterization. Furthermore, the profile of the look-around zone as determined from the multistep look-around processing workflow can be used to control operation (e.g., geo-steering) of the drill bit.

The inversions of the multistep look-around processing workflow can employ one or more formation models that represent a number of substantially parallel bedded transversely isotropic (TI) formation layers. Such formation model(s) can include values that represent horizontal resistivity Rh, vertical resistivity Rv or resistivity anisotropy (such as a Rv/Rh ratio), and thickness for a number of formation layers traversed by the tool(s) as well as formation dip (direction and magnitude) and position and orientation of the tool(s) within the formation layers. The formation model can also include other variables and/or parameters (not shown) that characterize the formation or the wellbore environment. For example, the formation model can include variables and/or parameters that represent geological structures of the formation (such as faults or other heterogeneities), properties of the formation (such as other rock or fluid properties), and borehole effects (such as tool eccentricity or mud filtrate invasion).

In embodiments, the formation model used for the second inversion look-around processing can be initialized according to the values of the formation model that result from the first inversion look-around processing. There can be a large difference in the depth of investigation between the propagation-type resistivity tool and the directional EM tool such that the measurements of the directional EM tool do not resolve resistivity anisotropy at the resolution of the measurements of the propagation resistivity tool. In this case, the formation model that results from the first inversion look-around processing can be the upscaled (coarsened) in order to account for the lower resolution of measurements (particularly, short-spacing measurements) of the directional EM tool and the second inversion look-around processing associated therewith. The upscaled formation model can then be used as the initial formation model (or guess) for the second inversion look-around processing. Certain parts of the formation model used for the second inversion look-around processing (such as the layers, layer thicknesses and horizontal resistivity Rh values of this formation model) can be fixed to the corresponding values of the formation model that result from the first inversion look-around processing.

In embodiment(s), the second inversion look-around processing can involve an inversion (referred to as a "resistivity anisotropy inversion") that interprets EM measurements of the directional EM tool to determine a profile of the vertical resistivity Rv or resistivity anisotropy of one or more formation layers of the look-around zone. The upscaled formation model derived from the results of the first inversion look-around processing can be used as the initial formation model for the resistivity anisotropy inversion. Furthermore, initial values for the vertical resistivity Rv or resistivity anisotropy values of the formation layers of the formation model can be based on the vertical resistivity Rv or resistivity anisotropy values of the formation layers of the formation model as determined by the second inversion look-around processing for an earlier look-around zone of the formation. Certain parts of the formation model (such as the layers, layer thicknesses and horizontal resistivity Rh values) for the resistivity anisotropy inversion can be fixed to the corresponding values of the formation model that result from the first inversion look-around processing for the same look-around zone of the formation.

The second inversion look-around processing can further involve an inversion (referred to as a "dip inversion") that interprets EM measurements of the directional EM tool to determine formation dip of the look-around zone. The dip inversion can follow the resistivity anisotropy inversion. The upscaled formation model derived from the results of the first inversion look-around processing can be used as the initial formation model for the dip inversion. Furthermore, the initial dip of the formation layers of the formation model can be based on the dip of the formation layers of the formation model as determined by the second inversion look-around processing for an earlier look-around zone of the formation. Certain parts of the formation model (such as the layers, layer thicknesses and horizontal resistivity Rh values) for the dip inversion can be fixed to the corresponding values of the formation model that result from the first inversion look-around processing for the same look-around zone of the formation.

The second inversion look-around processing can further involve an inversion (referred to as a "resistivity anisotropy and dip inversion") that interprets measurements of the directional EM tool to determine formation dip and a profile of the vertical resistivity Rv or resistivity anisotropy of one or more formation layers of the look-around zone. The resistivity anisotropy and dip inversion can refine the formation dip and the profile of the vertical resistivity Rv or resistivity anisotropy of the look-around zone as determined from the separate directional anisotropy inversion and the directional dip inversion. The formation model derived from the results of the resistivity anisotropy inversion and the dip inversion can be used as the initial formation model for the resistivity anisotropy and dip inversion. Certain parts of the formation model (such as the layers, layer thicknesses and horizontal resistivity Rh values) used for the resistivity anisotropy and dip inversion can be fixed to the corresponding values of the formation model that result from the first inversion look-around processing for the same look-around zone of the formation.

The formation model that results from the second inversion look-around processing can be used in inversion look-ahead processing that characterizes a look-ahead zone of the formation. The inversion look-ahead processing can interpret EM measurements of the directional EM tool to determine formation dip and a profile of the horizontal resistivity Rh, the vertical resistivity Rv or resistivity anisotropy and bed boundaries of one or more formation layers of the look-ahead zone of the formation. The formation dip and the profile of horizontal resistivity Rh, and vertical resistivity Rv or resistivity anisotropy of the one or more formation layers of the look-ahead zone as determined from the inversion look-ahead processing can provide a full resistivity profile of the formation.

The formation dip and resistivity profile of the look-ahead zone as determined from the inversion look-ahead processing can be used to update a reservoir model or part thereof that corresponds to the look-ahead zone for visualization and reservoir analysis and/or reservoir characterization. Furthermore, the formation dip and the resistivity profile of the look-ahead zone as determined from the inversion look-ahead processing can be used to control operation (e.g., geo-stopping) of the drill bit.

The EM measurements of the directional EM tool used in the inversion look-ahead processing can be sensitive to boundaries when transmitter or receiver antennae cross them. To address the processing efficiency and measurement sensitivity issue, for a region outside the look-ahead inversion window (i.e., the look-behind formation), the profile of the formation layers of the formation model can be coarsened, keeping only the "significant" boundaries that contribute to the response. Thus, in the coarsened region behind the far receiver, the response sensitivity is very low and the effect of formation boundaries in this region are removed from the look-ahead inversion processing. The inversion look-ahead processing can use a pixel-based or model-based approach as described herein.

In order to improve the robustness of the workflow, special care can be taken in the initialization of the formation model used for the second inversion look-around processing that characterizes the anisotropic resistivity and formation dip of the look-around zone. Specifically, the formation model can start with 0° dip (or some predefined value if available from other data) and an isotropic horizontal resistivity profile, since anisotropy and dip information are not available initially. The bounds of the refinement of the inversion can be relaxed because initial results may not be as reliable due to lack of sensitivity to resistivity anisotropy. Nevertheless, the inversion look-ahead processing may be affected initially, but as the drilling progresses and new data are acquired, the workflow can automatically correct and improve the characterization of the look-around zone as well as the characterization of the look-ahead zone.

Other workflows for look-ahead interpretation of EM measurements are described and claimed. The workflows can also involve interpretation of look-around resistivity measurements to aid in the characterization of the look-ahead zone.

In other example workflows, the shallow resistivity measurements of another tool (e.g. triaxial resistivity tool) can be interpreted to determine the resistivity profile (including horizontal resistivity Rh and vertical resistivity Rv or resistivity anisotropy) and formation dip for both the look-around and look-ahead zones of the formation.

Further features and aspects of example embodiments of the present invention are described in more detail below with reference to the appended Figures.

BRIEF DESCRIPTION OF THE DRAWINGS

FIG. 2A shows exemplary modules of a LWD tool that is part of the bottom-hole assembly of the LWD system of FIG. 1.

FIG. 2B is a schematic illustration of exemplary tilted orientations of transmitter and receiver antennae of a directional EM tool that is part of the bottom-hole assembly of FIG. 2A.

FIG. 2E is a schematic illustration of exemplary propagation-type resistivity tool that is part of the bottom-hole assembly of FIG. 2A.

FIG. 8 is a chart that illustrates how formation dip and resistivity anisotropy affect the estimate of the horizontal resistivity Rh derived from the apparent resistivity $R_{CDR}$ solved by the First Inversion Look-Ahead Processing (block 407) of FIGS. 4A-4C and 5.

Figure 4A:
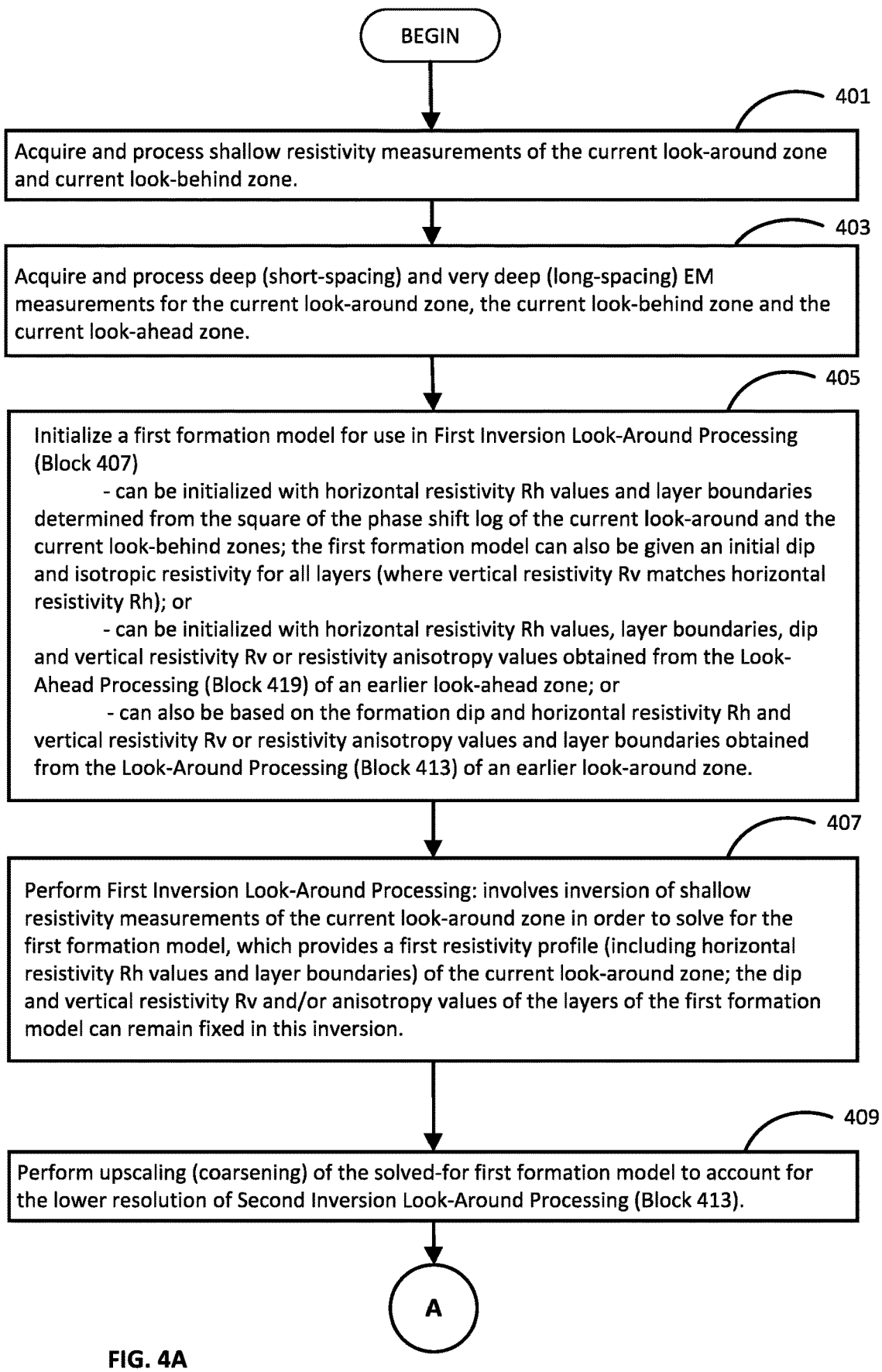
FIGS. 4A-4C, collectively, is a flow chart of an illustrative inversion-based workflow that uses the resistivity and directional EM LWD modules of the bottom-hole assembly of FIG. 2A together with a multistep look-around processing workflow that characterizes the current look-around zone as well as look-ahead processing that characterizes the current look-ahead zone.
Figure 4B:
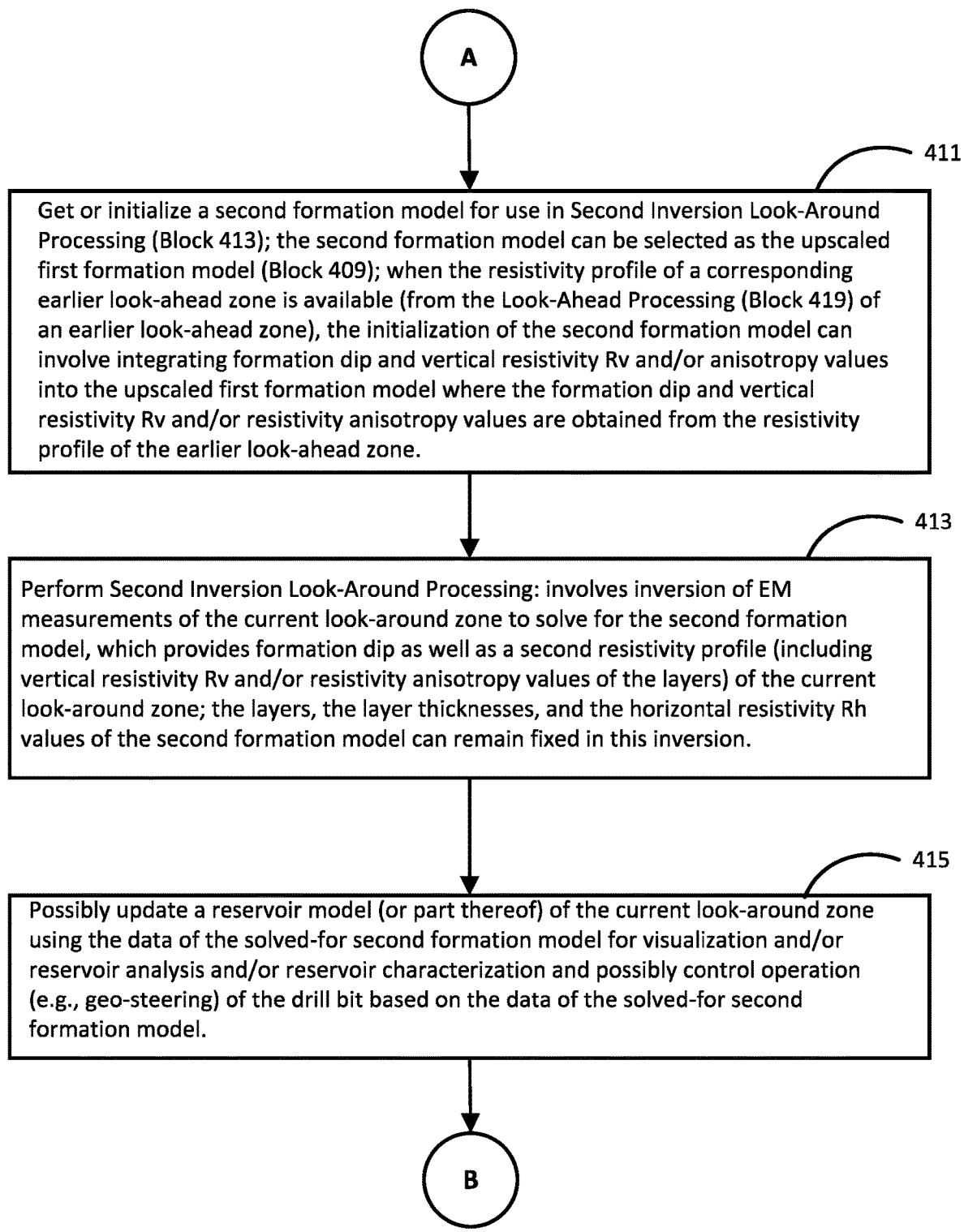
Figure 4C:
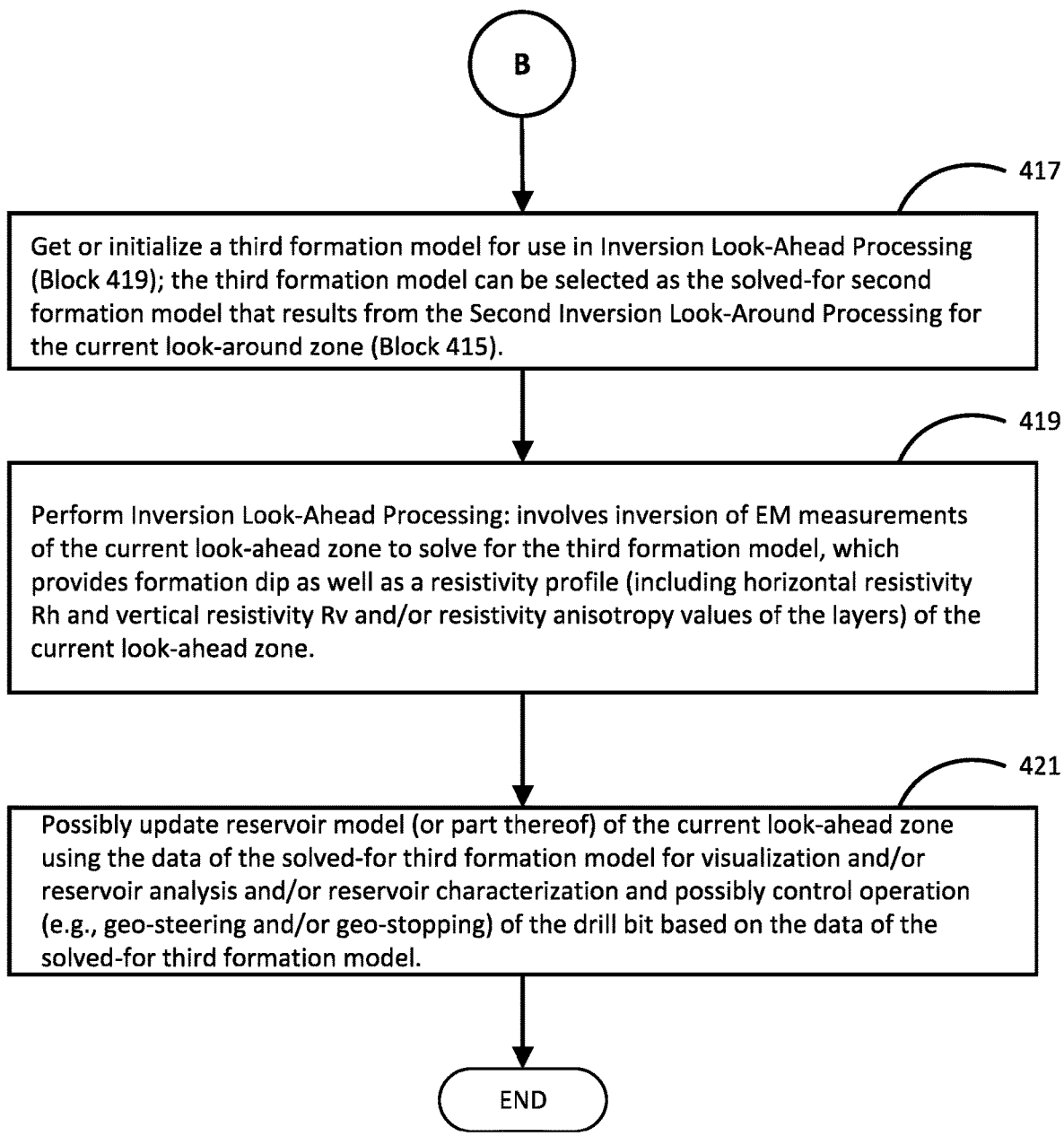

this workflow can substitute operations for the First and Second Inversion Look-Around Processing (blocks 405 to 413) of FIGS. 4A-4C.

Figure 11A:
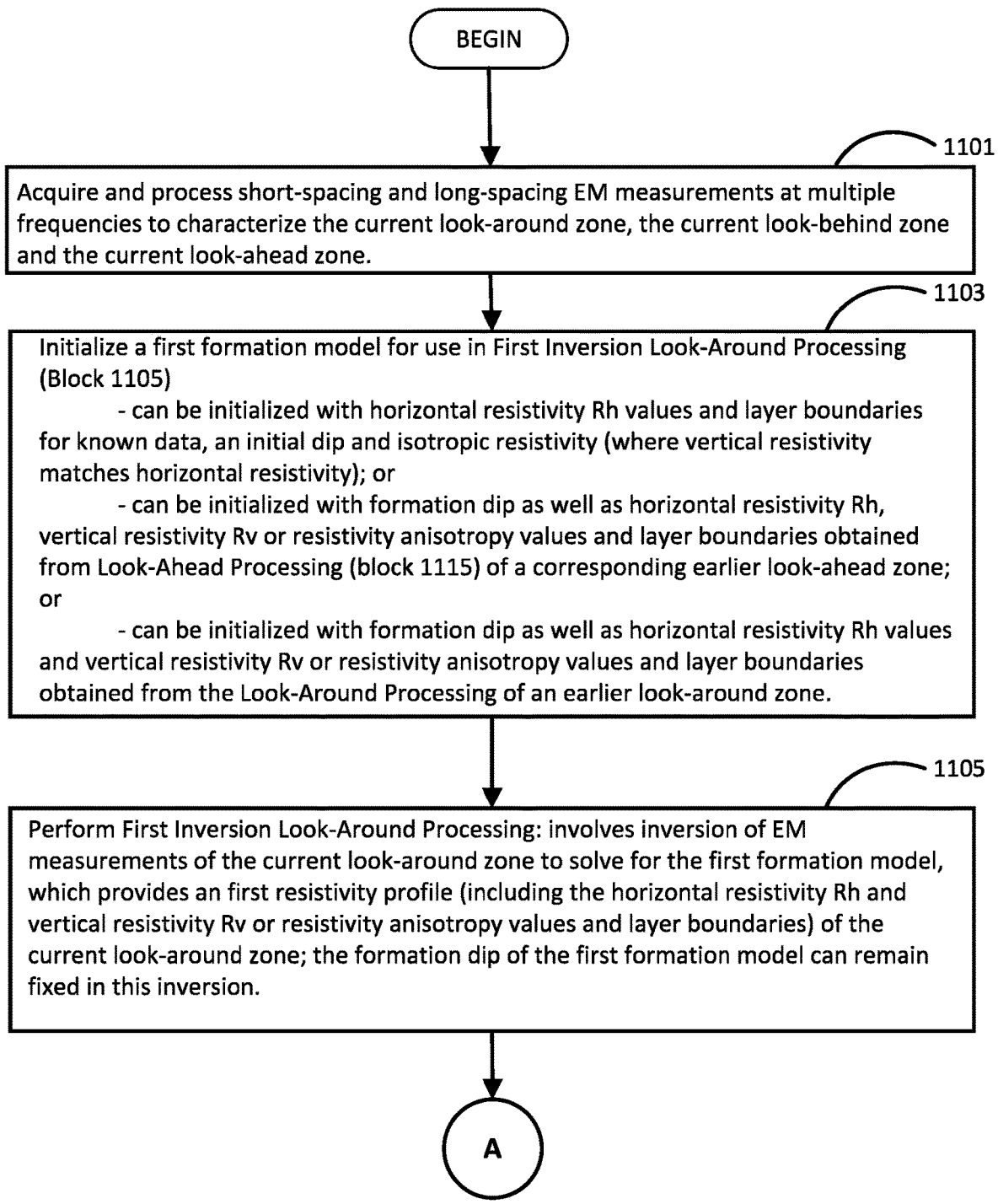
Figure 11B:
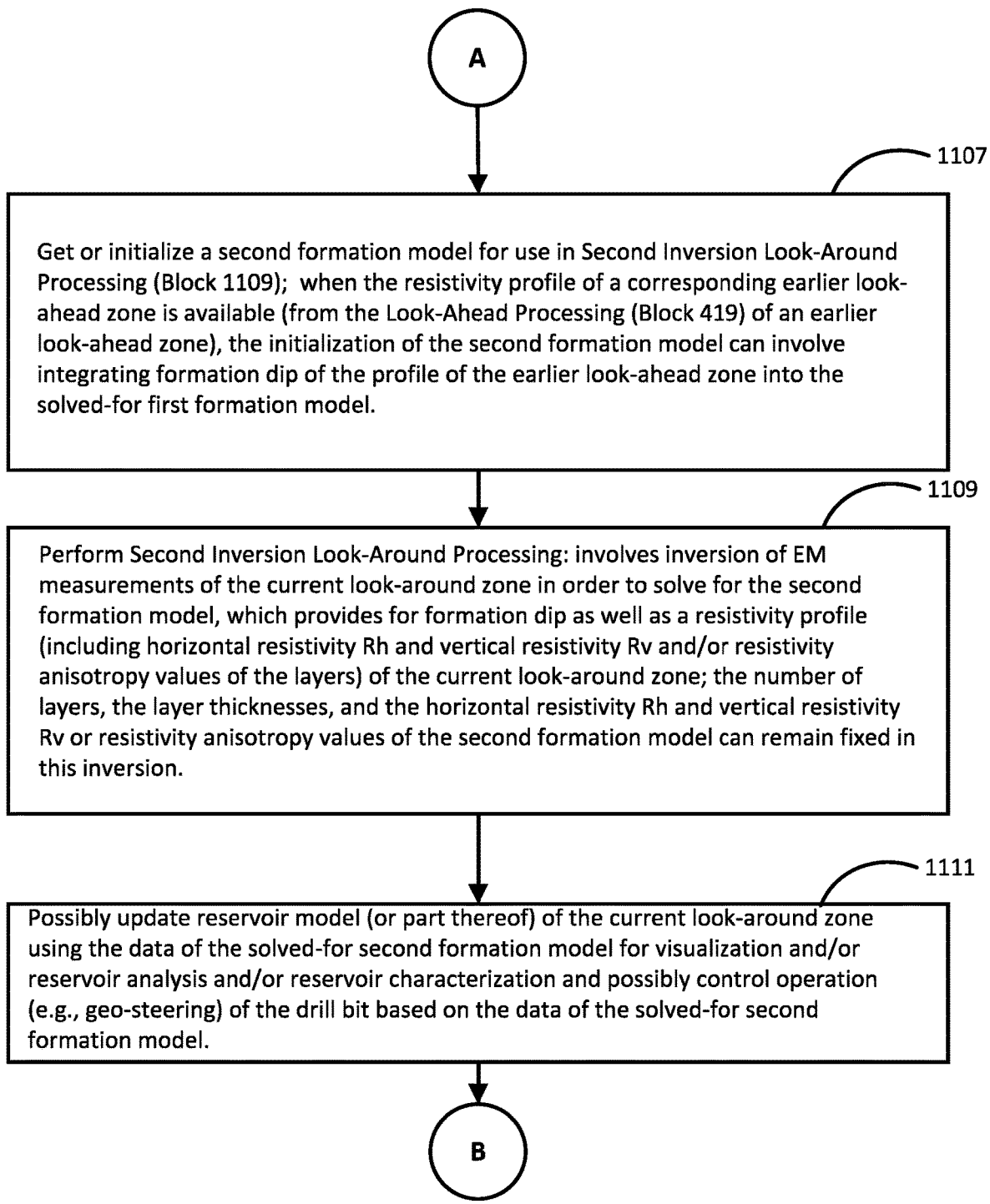
Figure 11C:
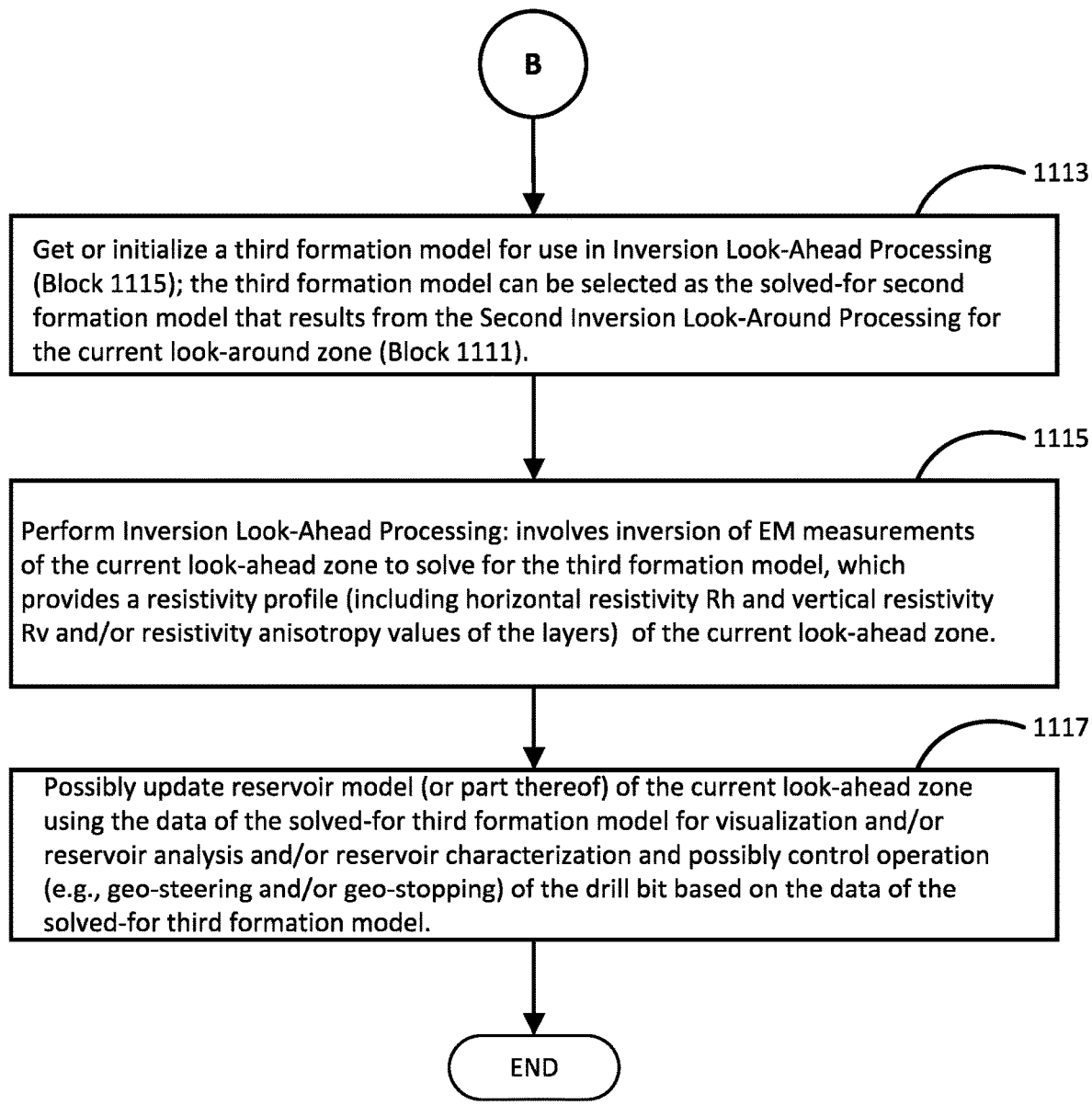

FIGS. 11A-11C, collectively, is a flowchart illustrating a workflow that characterizes the current look-around zone and the current look-ahead zone using only directional EM measurements of the directional EM tool of the bottom-hole assembly of FIG. 2A.

FIGS. 12A-12B, 13A-13B, 14A-14B, 15A-15B, 16, 17A-17B, 18, 19A-19B, and 20A-20B are plots that aid in visualizing the results of the workflows described herein.

Figure 21:
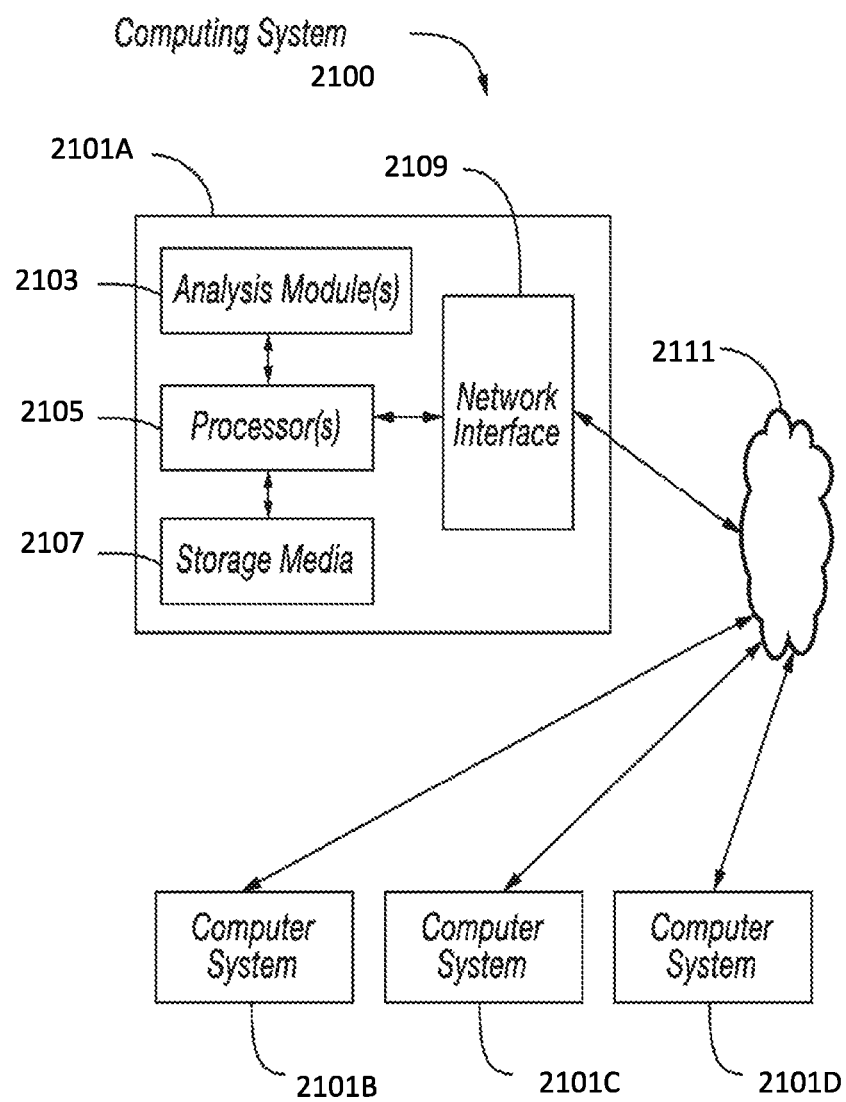

FIG. 21 is a schematic diagram of an example computing system that can be used to implement the computer processing system of FIG. 1A.

DETAILED DESCRIPTION OF THE PREFERRED EMBODIMENTS

Figure 1:
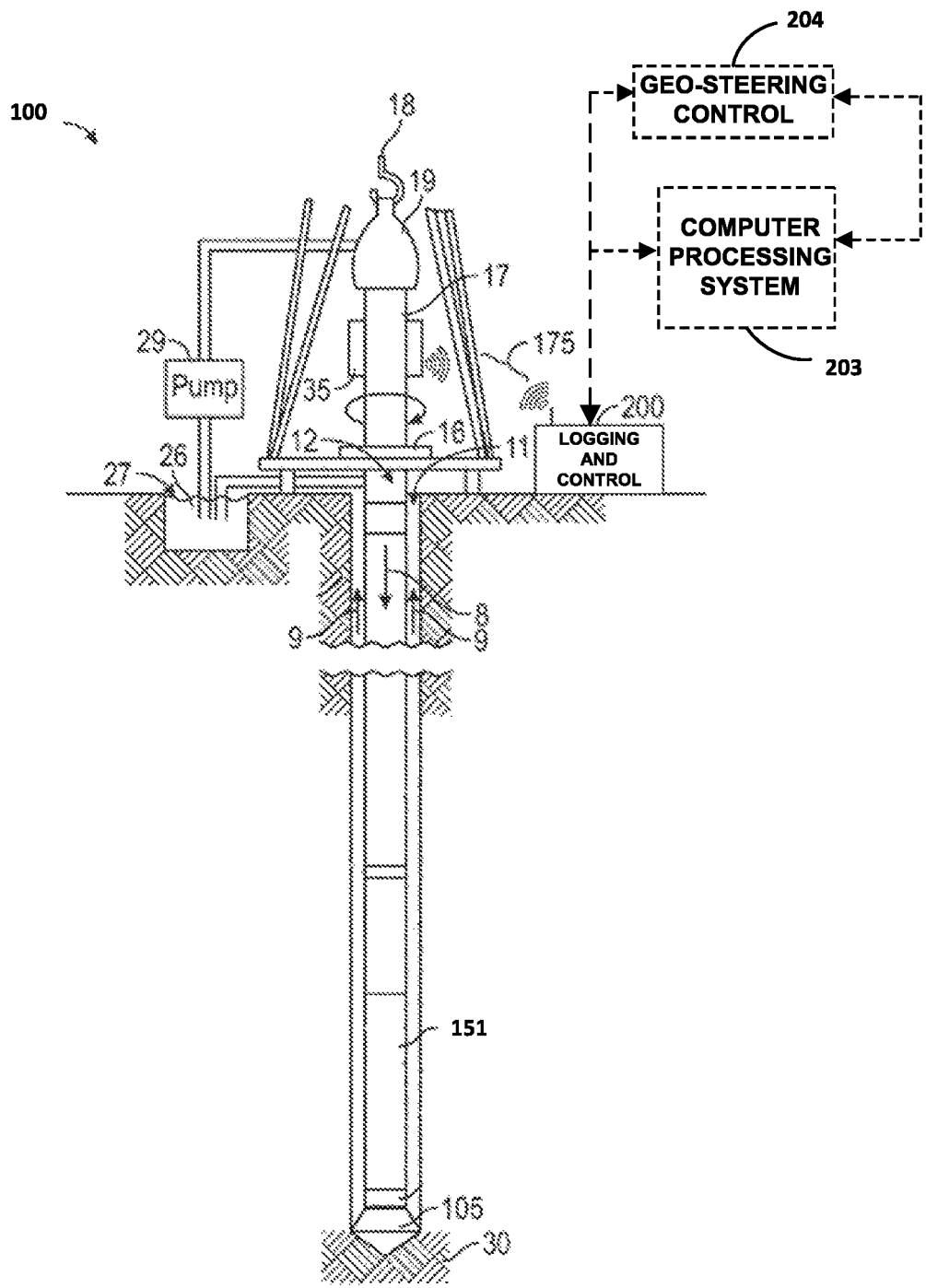
FIG. 1 is a schematic diagram of a wellsite and a drilled well that embodies an exemplary logging-while-drilling (LWD) system according to the present disclosure.

FIG. 1 illustrates a while-drilling wellsite environment in which the disclosed modeling and inversion methods can be employed to process acquired measurements. The wellsite can be onshore or offshore. In this exemplary system, a borehole or wellbore 11 is formed in a subsurface formation reservoir 30 by directional rotary. A drill string 12 is suspended within the borehole 11 and has a bottom hole assembly 151 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well-known manner, the drilling fluid lubricates the drill bit 105 and carries formation cuttings up to the surface as it is returned to the pit 27 for recirculation.

As is known in the art, sensors may be provided about the wellsite to collect data, preferably in real time, concerning the operation of the wellsite, as well as conditions at the wellsite. For example, such surface sensors may be provided to measure parameters such as standpipe pressure, hook load, depth, surface torque, rotary rpm, among others.

The bottom hole assembly 151 of the illustrated embodiment includes a number of logging-while drilling (LWD) modules that operate as individual LWD tools or multiple modules that operate together a part of a single LWD tool, possibly one or more measurement-while-drilling (MWD) modules, and a rotary steerable system that controls the drilling direction of the drill bit. An example BHA 151 is shown in FIG. 2A. The LWD modules of the LWD tool can be housed in a special type of drill collar as is known in the art. The LWD modules of the LWD tool includes capabilities for measuring and storing directional electromagnetic response data that is sensitive to resistivity profile of the formation in the vicinity of the BHA 151. The MWD module(s) can also be housed in a special type of drill collar as is known in the art. The MWD modules includes capabilities for measuring, processing, and storing information that characterizes position and direction of the drill string 12 and the drill bit of the BHA 151 as well as other drilling measurements, such as a weight-on-bit, torque, and shock and/or vibration. As used herein, the term "module" as applied to LWD and MWD devices is understood to mean either a single tool or a suite of multiple tools contained in a single modular device.

The BHA 151 also includes a downhole telemetry subsystem that communicates data signals and control signals between the components of the BHA 151 (including the modules of the LWD tool) and a surface-located logging and control unit 200 via electronic subsystem 35. The downhole telemetry subsystem can employ a variety of telemetry methods, such as wired telemetry methods (e.g., drill pipe that incorporate telemetry cables or fiber optic cables) and wireless telemetry method (e.g., mud-pulse telemetry methods, electromagnetic telemetry methods, and acoustic telemetry methods). The downhole telemetry subsystem can also supply electrical power supply signals generated by a surface-located power source for supply to the components of the BHA 151. The BHA 151 can also include a power supply transformer/regulator for transforming the electric power supply signals supplied by the surface-located power source to appropriate levels suitable for use by the components of the BHA 151. In alternate embodiments, the BHA 151 can include an apparatus for generating electrical power for supply to the components of the BHA, such as a mud turbine generator powered by the flow of the drilling fluid. Other power and/or battery systems may be employed.

The wellsite of FIG. 1 can also include the surface-located logging and control unit 4 that interfaces to computer processing system 203 via data communication links (shown as bidirectional dotted lines with arrows). A control module 204 (labeled "geo-steering control") can interface to the logging and control unit 200 and to the computer processing system 203 via data communication links (shown as bidirectional dotted lines with arrows) for geo-steering and geo-stopping applications as described herein. The data communication links between the surface-located components can utilize wired and/or wireless connection via one or more communication lines. The communication topology between these surface-located components can be point-to-point, point-to-multi point or multipoint-to-point. The wired connection(s) can employ a variety of cable types or wires using diverse wired protocols (serial, wired Ethernet, fiber channel, etc.). The wireless connection(s) can employ a variety of diverse wireless protocols (such as IEEE 802.11, Bluetooth, Zigbee or any non-standard RF or optical communication technology).

The computer processing system 203 can be configured to perform the inversion methods and workflows as described herein, which can be used to visualize and control the position and orientation of the BHA 151 during drilling operations. The control module 204 communicates with the logging and control unit 200 to control the position and orientation of the BHA 151 as determined by the operation of the computer processing system 203.

In general, the inversion methods (and corresponding systems) employ an initial estimate or formation model that includes parameters that represent the geometry and properties (including anisotropic resistivity) of the earth formation surrounding the BHA 151. The initial values for the parameters of the formation model can be derived in various ways as described herein. Simulated measurements of the LWD modules of the BHA 151 can be calculated based on the initial parameters of the formation model. The calculation of the simulated measurements can involve forward modeling, which applies the initial parameters of the formation model to a set of theoretical equations to generate the simulated measurements. The simulated measurements are then compared to the corresponding actual measurements made by the LWD modules of the BHA 151. Differences between the simulated measurements and the corresponding actual measurements can be used to adjust the parameters of the formation model, and the adjusted formation model is used again to calculate simulated measurements of the LWD modules of the BHA 151. The simulated measurements based on the adjusted formation model are compared to corresponding actual measurements made by the LWD modules of the BHA 151, and any difference between them is used to again adjust the parameters of the formation model. This process is generally repeated until the differences between the simulated measurements of the LWD modules of the BHA 151 and corresponding actual measurements made by the LWD modules of the BHA 151 fall below a pre-selected threshold. By way of example, commonly-owned U.S. Pat. No. 6,594,584 describes some modern inversion techniques and is incorporated herein by reference in its entirety.

The inversion methods (and corresponding systems) disclosed herein are intended to enhance the ability to dynamically control the position and orientation of the BHA 151 such that the drill bit of the BHA 151 follows the planned wellbore trajectory if practical. Furthermore, the position and orientation of the BHA 151 can be dynamically controlled in order to stay at an optimal distance with respect to reservoir boundaries and contacts, or to avoid nearby faults or other heterogeneities that are offset with respect to the BHA 151 along the planned wellbore trajectory during the drilling process. Furthermore, the position and orientation of the BHA 151 can be dynamically controlled to adjust to the trajectory of the wellbore (geo-steering) and terminate the wellbore (geo-stopping) based on the detection and characterization of reservoir boundaries and contacts or faults or other heterogeneities that are offset with respect to the BHA 151 during the drilling process. As used herein, a heterogeneity is a difference in composition and/or character (such as a difference in porosity and/or fluid saturation) of the rock matrix of the formation that results in an abrupt or significant change in resistivity of the rock matrix. For example, a heterogeneity can be a boundary, contact, or fault in the rock matrix.

Furthermore, the inversion methods (and corresponding systems) disclosed herein can be used as part of post-drilling analysis and model refinement for improved reservoir characterization in vertical, deviated, high-angle, and horizontal wells.

Referring to FIG. 2A, an example BHA 151 incorporates a number of LWD modules that includes a transmitter subassembly 210 and two receiver subassemblies 208 and 209 that embody a directional EM tool. The transmitter subassembly 210 is placed close to the drill bit 212 and includes one or more transmitter antennae. At least one transmitter antenna of the directional EM tool is tilted. Each of the receiver subassemblies 208 and 209 includes one or more receiver antennae configured to sense the EM field in order to make both short spacing (deep DOI) and long spacing (very deep DOI) directional EM measurements of the formation in the vicinity of the BHA 151.

In one embodiment, the transmitter subassembly 210 may have a triaxial set of antennas, comprising of combination of axial, tilted and transverse antennas. As used herein, an axial antenna is one whose dipole moment is substantially parallel with the longitudinal axis of the tool. Axial antennas are commonly wound about the circumference of the tool such that the plane of the antenna is orthogonal to the tool axis. Axial antennas produce a radiation pattern that is equivalent to a dipole along the axis of the tool (by convention the z-direction). A transverse antenna is one whose dipole moment is substantially perpendicular to the longitudinal axis of the tool. A transverse antenna may include a saddle coil (e.g., as disclosed in commonly owned U.S. Patent Publications 2011/0074427 and 2011/0238312, herein incorporated by reference in their entireties) or multiple collocated tilted coils and generate a radiation pattern that is equivalent to a dipole that is perpendicular to the axis of the tool (by convention the x or y direction). A tilted antenna is one whose dipole moment is neither parallel nor perpendicular to the longitudinal axis of the tool. Tilted antennas generate a mixed mode radiation pattern (i.e., a radiation pattern in which the dipole moment is neither parallel nor perpendicular with the tool axis).

The BHA 151 also includes a rotary steerable system and drill bit 212. The rotary steerable system can be used to dynamically adjust the direction of the drilling performed by the drill bit 212 under commands communicated from the geo-steering control module 204 via the logging and control unit 4 and the telemetry subsystem of the BHA 151. The method used by the rotary steerable system to dynamically adjust the direction of the drilling can generally fall into two categories, these being "push-the-bit" or "point-the-bit". Push-the-bit systems use pads on the outside of the tool which press against the wellbore thereby causing the bit to press on the opposite side causing a direction change. Point-the-bit systems cause the bit direction to change relative to the rest of the tool by bending the main shaft running through it.

In one embodiment, the antennae of the receiver subassemblies 208, 209 of the directional EM tool are tilted and spaced relative to the tilted antenna of the transmitter subassembly 210 along the axis of the BHA 151 as shown in FIG. 2B. This tool is available commercially under the name GEOSPHERE™ from Schlumberger Technology Corporation of Sugar Land, Tex. The tilted antennae each have a magnetic dipole moment that is not aligned with the tool axis (e.g., the central axis of the BHA 151) nor orthogonal to the tool axis. The transmitter subassembly 210 and receiver subassemblies 208 and 209 may contain a set of orthogonal magnetic dipole antennas, with axial and transverse coils that can also be combined with tilted antennae.

In embodiments, the antennae of the transmitter subassembly 210 and the receiver subassemblies 208, 209 of the directional EM tool can be configurable with up to three spacings (with two shown on FIGS. 2A and 2B).

It will be understood, however, that the embodiments disclosed herein are not limited to any particular electromagnetic logging tool configuration, and that the directional EM tool depicted in FIGS. 2A and 2B is merely one example of a suitable directional EM logging tool.

For instance, in other embodiments, the receiver subassemblies 208 and 209 can employ a combination of axial, tilted and transverse antennas, capable of sensing all components of EM fields by measuring magnetic field in different directions. Note that electromagnetic measurements determined from electromagnetic signals from axial transmitter received by axial receiver antennae may be referred to as conventional or non-directional measurements, while electromagnetic measurements determined from electromagnetic signals from transverse or tilted transmitter or receiver antennae may be referred to as directional measurements.

In still other embodiments, the directional EM tool of the BHA 151 can include multiple transmitter subassemblies and multiple receiver subassemblies spaced axially along the tool body as disclosed in commonly owned US Patent Publ. 2017/0075021, herein incorporated by reference in its entirety. This tool is available commercially under the name PERISCOPE™ from Schlumberger Technology Corporation of Sugar Land, Tex. The multiple transmitter subassemblies can include one or more axial antennae and one or more transverse antennae spaced along the tool axis. The receiver subassemblies can include multiple receivers with axial antennae that are spaced along the tool axis between the transmitter subassemblies. Such receivers may be used to obtain conventional non-directional type propagation resistivity measurements. The receiver subassemblies can also include multiple receivers with tilted antennae that are spaced along the tool axis about the transmitter subassemblies. Such a directional arrangement (including tilted and/or transverse receiver antennae) produces a preferential sensitivity on one azimuthal orientation of the tool that better enables bed boundaries detection and evaluation of distance and orientation and other features of the subterranean formations to be identified and located. Furthermore, by providing both axial transmitters and axial receiver pairs as well as axial transmitter and tilted receiver pairs, the tool is capable of making both non-directional and directional electromagnetic measurements. Furthermore, the tool is capable of providing symmetrized and anti-symmetrized measurements (up and down measurements) with the same antenna spacings. As an example, in one particular embodiment, the tool may be capable of making measurements using transmitter-receiver pairs with spacings of 22, 34, 84, and 96 inches.

In still other embodiments, the tool configuration may have multiple transmitter assemblies and more than two receiver subassemblies. Although the antennae have been described in terms of magnetic dipole antennas, the antennae also may comprise electric dipole antennas. By way of example, magnetic dipole antennas may use coils, while electric dipole antennas may use electrodes and/or toroids.

Figure 2C:
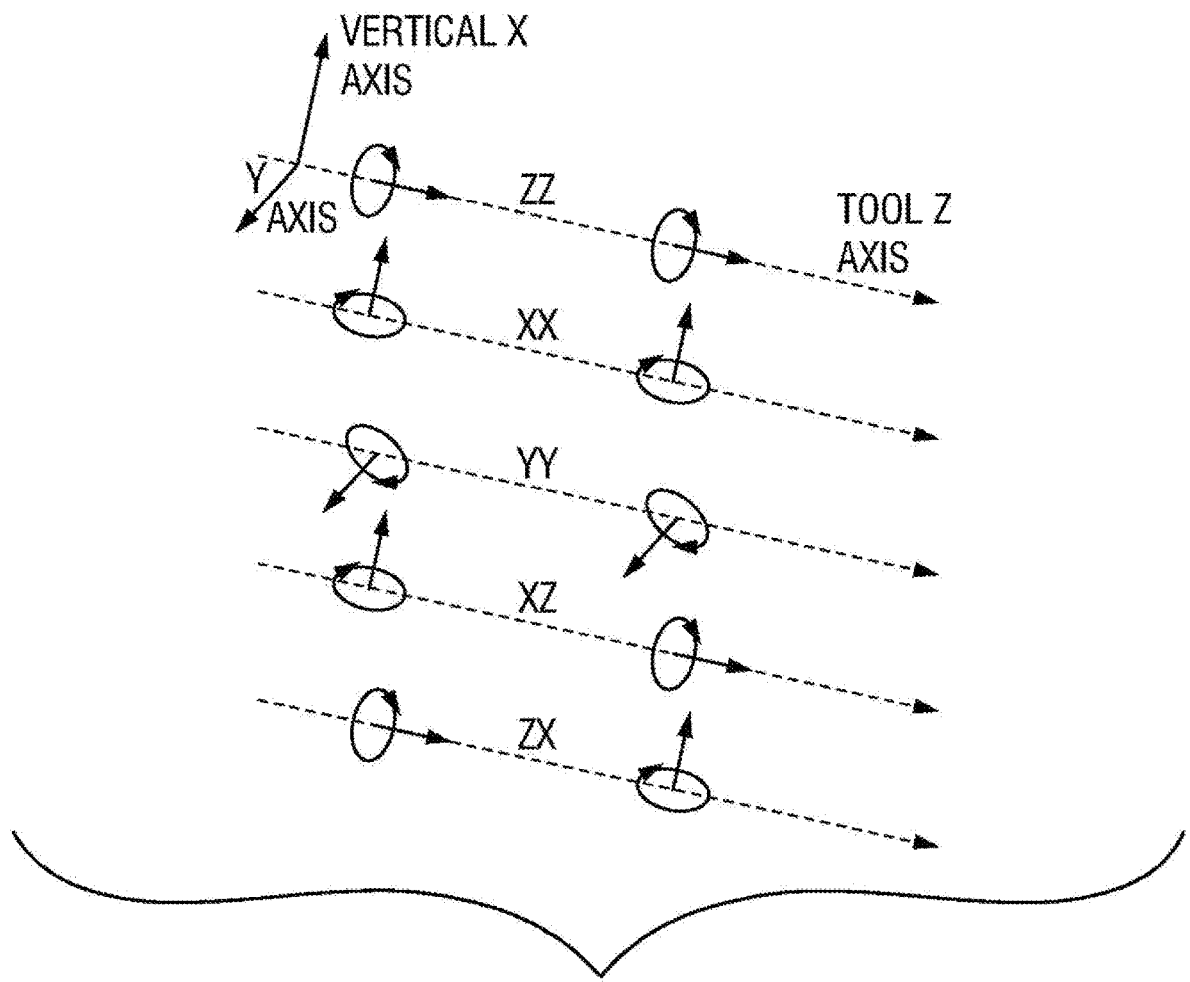
FIG. 2C is a schematic illustration of an electromagnetic mutual impedance tensor that can be derived from measurements of the directional EM tool of FIG. 2B, including the relation of the components of the tensor to antennae orientations.

The antennae of the receiver subassemblies spaced along the directional EM tool can provide phase and amplitude voltage measurements at a broad range of sub-100 kHz frequencies. For each transmitter/receiver spacing and frequency, the phase and amplitude response measurement is a linear combination of elementary electromagnetic couplings, allowing determination of nine components of a 3D mutual impedance tensor between transmitter and receiver during tool rotation as shown in FIG. 2C. In this example, the Z axis is aligned with the tool axis, the X and Y axes are perpendicular to each other and to the Z axis. The first letter of the tensor component corresponds to the dipole moment direction of the receiver, and the second letter corresponds to the dipole moment direction of the transmitter. In this configuration, measurements can be made of the voltage amplitude and phase at a receiver antenna as induced by a signal transmitted from the transmitter antenna. Such receiver amplitude and phase measurements are proportional to the magnitudes and depend on directions of the transmitter and receiver dipole moments. The 3D mutual impedance tensor couplings depend on the frequency of the transmitted signal, the transmitter/receiver spacing, tool inclination, and formation parameters including anisotropic resistivity of the formation (i.e., horizontal and vertical resistivity) and formation geometry (i.e., position and orientation of boundaries, contacts, faults and other heterogeneities). Exemplary methods for determining the components of the 3D mutual impedance tensor from the voltage measurements of the LWD modules of the BHA 151 are described in detail in U.S. Pat. No. 8,736,270, commonly assigned to assignee of the present invention and herein incorporated by reference in its entirety.

Figure 2D:
FIG. 2D is a chart that summarizes a variety of directional measurements that are generated by combining various impedance tensor components of FIG. 2C as determined from the transmitter/receiver voltages measurements during tool rotation.

Furthermore, individual components of the 3D mutual impedance tensor may be used, or various combinations of the 3D mutual impedance tensor components can be combined, to obtain a set of directional measurements that is used to infer formation properties and structure. FIG. 2D summarizes a variety of directional measurements that can be generated by combining various tensor components as determined from the transmitter/receiver measurements during tool rotation, and corresponding spatial sensitivities in XY plane. The harmonic resistivity measurements (UHR) are sensitive to formation resistivity and resistivity anisotropy and have no azimuthal sensitivity with respect to the tool axis. The symmetrized directional measurements (USD) are sensitive to boundaries and conductivity contrast if the tool is not crossing boundaries and are largely insensitive to relative dip and resistivity anisotropy of the formation. The measurements are created using elementary couplings insensitive to the tool azimuth and coupling with $\cos\theta$ sensitivity with respect to tool rotation azimuth $\theta$, therefore these measurements are also referred as the first harmonic measurement. In XY plane, the spatial sensitivity of the measurements has two symmetric lobes of different polarity, either positive or negative depending on the presence of conductivity above or below the tool (in the X direction). The anti-symmetrized directional measurements (UAD) are sensitive to relative dip and resistivity anisotropy of the formation and are largely insensitive to boundaries unless there is a boundary between transmitter and receiver sub. This class of measurements is composed using the same components as USD measurements, also including couplings that have $\cos\theta$ azimuthal sensitivity with respect to tool axis. The harmonic anisotropy measurements (UHA) are sensitive to resistivity anisotropy in non-vertical wells and boundaries of the formation in HA/HZ wells. These measurements are created using transverse couplings with $\cos 2\theta$ azimuthal sensitivity with respect to tool axis for tool rotation azimuth $\theta$, and are also called the second harmonic measurements, with sensitivity in XY plane having four polarized lobes distributed about the tool axis. The 3D indicator measurements (U3DF) is sensitive to lateral heterogeneities in the formation with respect to layering (such as faults at an azimuth different from layering azimuth) that are offset from the tool in the Y direction (assuming boundaries are in the X direction).

Formation dip (also referred to as "dip" herein) characterizes the tilted orientation of the layering (or bedding) of the formation relative to a horizontal plane. Formation dip is commonly represented by a dip angle and a dip direction. The dip angle represents the steepest angle of descent of the tilted formation layering relative to the horizontal plane. The dip direction is the azimuth of the direction the dip as projected onto the horizontal plane. Formation dip can also be characterized by an apparent azimuthal orientation of the formation layering of the formation relative to the tool reference "up" orientation. This angle (referred to as the Apparent Azimuth) refers to the azimuthal offset of the normal axis X' of the layering of formation with respect to the reference tool orientation defined by axis X.

In embodiments, the LWD modules of the BHA 151 can also include a propagation-type resistivity tool 211 that broadcasts a high frequency electromagnetic wave and measures the attenuation and phase shift differences between voltages induced at two receivers. The phase shift and attenuation can be transformed into apparent resistivity measurements, where phase shift apparent resistivities are typically shallower than the attenuation apparent resistivity measurements. In one embodiment, the propagation-type resistivity tool 211 can be realized by the compensated dual resistivity (CDR) tool, which has two transmitters symmetrically arranged around two receivers as shown in FIG. 2E. Each transmitter alternately broadcasts a 400 kHz and 2 MHz electromagnetic waves. A propagation measurement is made by taking the difference between the phases (phase shift) and amplitudes (attenuation) of the voltages recorded at the two receivers. Attenuation increases as a function of increasing conductivity, while the wavelength decreases as conductivity increases. Thus, the two measurements are monotonically increasing with to formation conductivity and can be used to generate resistivity logs. The phase shift and attenuation measurements generated by the upper transmitter between the two receivers, and by the lower transmitter between the two receivers, are averaged to symmetrize the tool response. This averaging is known as borehole compensation because it also reduces the effect of borehole rugosity.

Figure 2F:
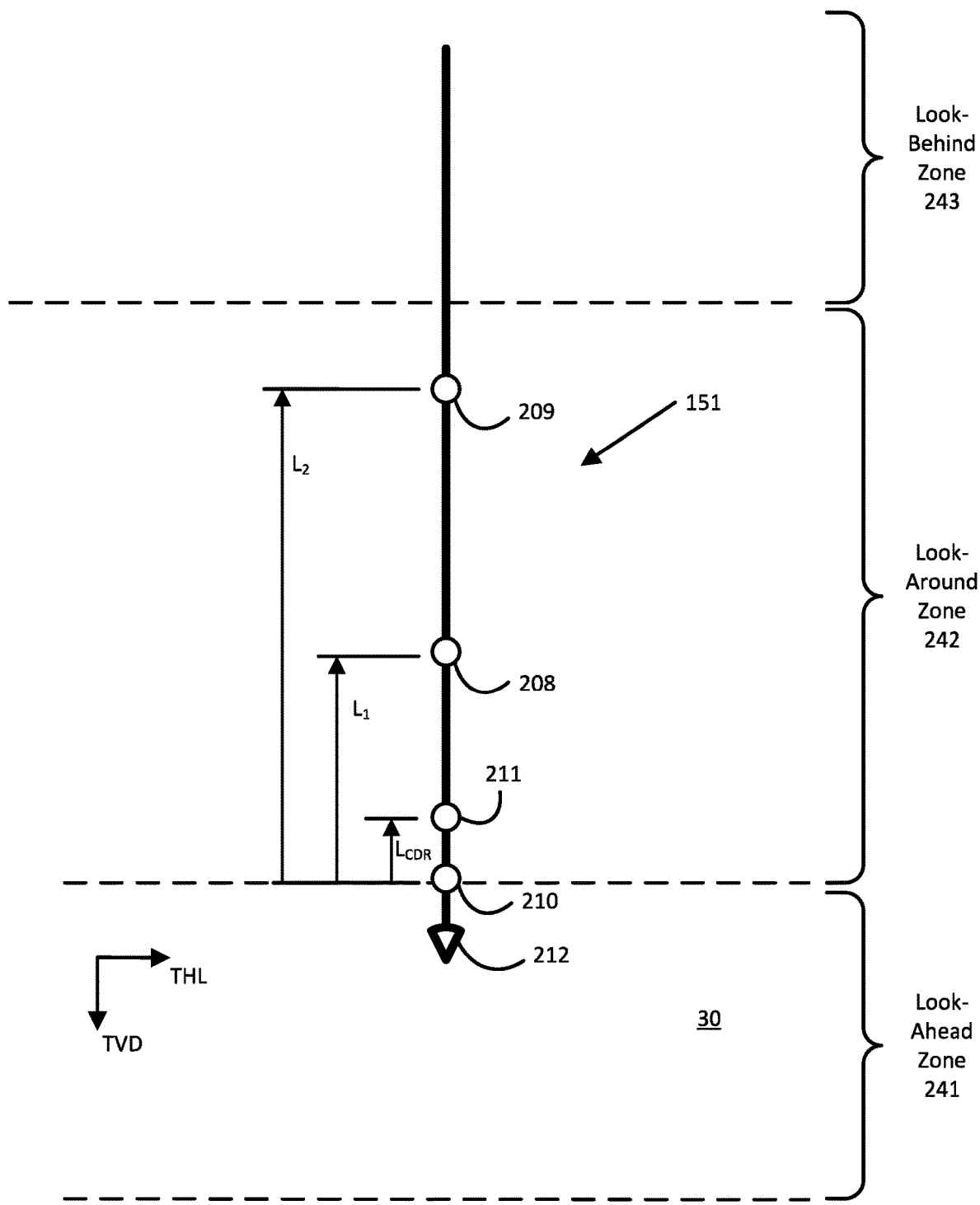
FIG. 2F is a schematic illustration of the bottom-hole assembly of FIG. 2B, showing the tool setup and identification of the look-around, look-ahead and look-behind formation zones.

FIG. 2F is a schematic view of an illustrative embodiment of the BHA 151 of FIG. 2A. The BHA 151 includes the drill bit 212 configured to drill a borehole in the formation as the drill bit 212 traverses the formation. The BHA 151 also includes a tilted-antenna transmitter subassembly 210 and receiver subassemblies 208 and 209 that embody the directional EM tool. The BHA 151 also includes the propagation tool 211.

In accordance with some examples, the BHA 151 has a modular design. In some examples, the modular design includes a transmitter sub and a receiver sub. In some examples, the BHA 151 may utilize the same or analogous hardware configurations and architecture as described in U.S. Pat. No. 7,755,361, which is incorporated herein by reference in its entirety. In some examples, the configuration differs from that of U.S. Pat. No. 7,755,361 in that measurements are closer to the bit, with the tilted transmitter immediately (or very close) behind the bit and sets of triaxial receivers disposed behind, for example, a rotary steerable system (RSS).

In accordance with some examples, the transmitter subassembly 210 is close (e.g., as close as reasonably possible) to the drill bit 212. In some examples, the transmitter subassembly 210 is less than 10 feet from the drill bit 212, although other examples may have the transmitter subassembly 110 at a distance of 10 feet or greater from the drill bit 212. In some examples, the transmitter subassembly 210 is 6 feet or less from the drill bit 212.

The receiver subassemblies 208 and 209 can be provided at respective distances $L_1$ and $L_2$ behind the transmitter subassembly 210 as shown. In some examples, the distance $L_1$ is greater than 20 feet, but in other examples the distance $L_1$ is less than 20 feet.

In some examples, the distance $L_1$ is between 20 feet and 40 feet. In some examples, the distance $L_1$ is between 25 feet and 35 feet, e.g., 30 feet.

In some examples, the distance $L_2$ is between 60 feet and 80 feet, although in other examples the distance $L_2$ can be outside of this range.

The example methods, workflows and systems described herein may utilize arbitrary spacing and number of receiver subassemblies. Thus, although a particular number of receiver and transmitter subassemblies may be described at particular distances from each other, it should be understood that any suitable number, including one, may be provided for the respective components and at any suitable spacing.

The propagation tool 211 is at a distance $L_{CDR}$ behind the transmitter subassembly 210 as shown. In some examples, the distance $L_{CDR}$ is less than 10 feet, although in other examples the distance $L_{CDR}$ may be 10 feet or greater. In some examples, the distance $L_{CDR}$ is 7 feet or less.

The example methods, workflows and systems described herein may utilize arbitrary frequencies and distribution of sensors.

Independent of the number of receivers used by the BHA 151, the portion of the geological formation that falls within the sensitivity range of the BHA 151 can be logically divided in three sections by depth as shown in FIG. 2F as follows:

(a) a look-ahead zone (or section) 241 of the formation 30—this is the zone (or section) of the formation 30 that is in the local vicinity of the BHA 151 and ahead (with regard to the direction of bit travel during drilling) of the propagation-type resistivity tool 211; the look-ahead zone 241 can extend ahead of the transmitter subassembly 210 of the directional EM tool and can extend ahead of the drill bit 212;

(b) a look-around zone (or section) 242 of the formation 30—this is the zone (or section) of the formation 30 that is in the local vicinity of the BHA 151 and between the propagation-type resistivity tool 211 and the farthest receiver subassembly 209 of the directional EM tool (taking the look-ahead inversion window 235 length into account); and (c) a look-behind zone (or section) 243 of the formation 30—this is the zone (or section) of the formation 30 that is in the local vicinity of the BHA 151 and behind the farthest receiver subassembly 209 of the directional EM tool (with regard to the direction of bit travel during drilling).

In one or more embodiments, the look-around zone 242 can be characterized by multistep look-around processing workflow that includes i) inversion operations (referred to herein as "first inversion look-around processing") that interpret shallow resistivity measurements of the propagation-type resistivity tool 211 of the BHA 151 (which are sensitive to variation in the shallow resistivity of the look-around zone 242) to determine a profile of the horizontal resistivity Rh for one or more formation layers of the look-around zone 242, and ii) inversion operations (referred to herein as "second inversion look-around processing") that interpret measurements of the directional EM tool of the BHA 151 (which are sensitive to anisotropic resistivity of the formation in look-around zone 242) to determine the formation dip and a profile of the vertical resistivity Rv or resistivity anisotropy of one or more formation layers of the look-around zone 242. Horizontal resistivity Rh of a formation layer is the resistivity (preferably in Ohm-m or Ωm) in the direction parallel to the bedding plane of the formation layer. Vertical resistivity Rv of a formation layer is the resistivity (preferably in Ohm-m or Ωm) in the direction perpendicular to the bedding plane of the formation layer. Electrical anisotropy or resistivity anisotropy of a formation layer is the ratio of the vertical resistivity Rv to the horizontal resistivity Rh of the formation layer at the scale of the resistivity measurement. The profile of the horizontal resistivity Rh of one or more formation layers of the look-around zone 242 as determined from the first inversion look around processing, the formation dip and the profile of the vertical resistivity Rv or resistivity anisotropy of one or more formation layers of the look-around zone 242 as determined from the second inversion look around processing (and possibly data characterizing other features or properties of the one or more formation layers of the look-around zone 242 as determined from the first and/or second inversion look around processing) can be a part of a more-complete profile of the look-around zone 242.

The resultant profile of the look-around zone 242 as determined from the multistep look-around processing can be used to update a reservoir model or part thereof that corresponds to the look-around zone 242 for visualization and reservoir analysis and/or reservoir characterization. Furthermore, the profile of the look-around zone 242 as determined from the multistep look-around processing can be used to control operation (e.g., geo-steering) of the drill bit.

Figure 3:
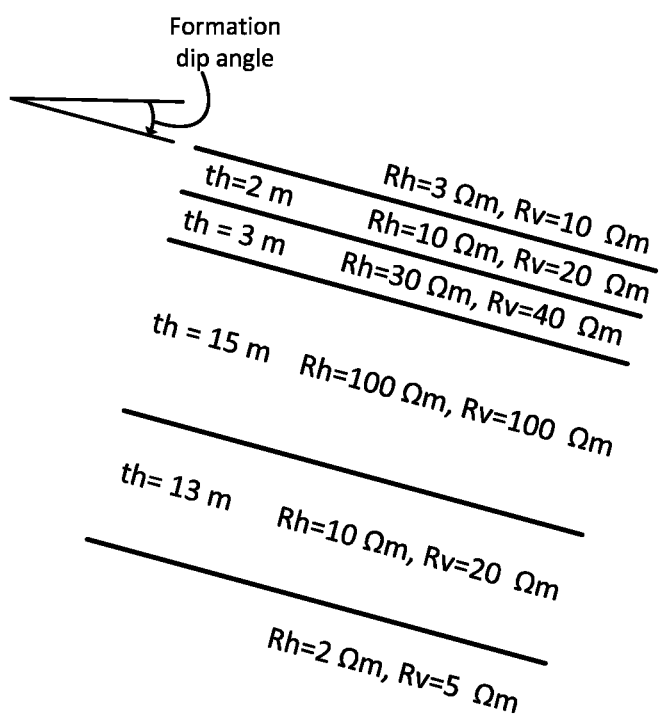
FIG. 3 is a schematic diagram of an exemplary formation model.

The inversions of the multistep look-around processing can employ one or more formation models that represent a number of substantially planar, parallel bedded transversely isotropic (TI) formation layers. Such formation model(s) can include values that represent horizontal resistivity Rh, vertical resistivity Rv or resistivity anisotropy, and thickness for a number of formation layers traversed by the BHA 151 as well as formation dip (direction and magnitude) and position and orientation of the BHA 151 within the formation layers. An example of an illustrative formation model is illustrated in FIG. 3, which includes four intermediate layers between top and bottom boundaries. The top boundary has a horizontal resistivity Rh of 3 $\Omega$m and a vertical resistivity Rv of 10 $\Omega$m and is assumed to have an infinite thickness. The bottom boundary has a horizontal resistivity Rh of 2 $\Omega$m and a vertical resistivity Rv of 5 $\Omega$m and is assumed to have an infinite thickness. The first intermediate layer below the top boundary has a horizontal resistivity Rh of 10 $\Omega$m and a vertical resistivity Rv of 20 $\Omega$m and is 2 meters thick. The second intermediate layer below the first intermediate layer has a horizontal resistivity Rh of 30 $\Omega$m and a vertical resistivity Rv of 40 $\Omega$m and is 3 meters thick. The third intermediate layer below the second intermediate layer has a horizontal resistivity Rh of 100 $\Omega$m and a vertical resistivity Rv of 100 $\Omega$m and is 15 meters thick. The fourth intermediate layer below the third intermediate layer and above the bottom boundary has a horizontal resistivity Rh of 10 $\Omega$m and a vertical resistivity Rv of 20 $\Omega$m and is 13 meters thick. The formation model can also include variables that represent the formation dip angle as shown (which assumes that the dip of the formation is changing slowly) as well as tool position/orientation within the layer structure. The formation model can also include other variables and/or parameters (not shown) that characterize the formation or the wellbore environment. For example, the formation model can include variables and/or parameters that represent geological structures of the formation (such as faults or other heterogeneities), properties of the formation (such as other rock or fluid properties), and borehole effects (such as tool eccentricity or mud filtrate invasion).

In embodiments, the formation model used for the second inversion look-around processing can be initialized according to the values of the formation model that result from the first inversion look-around processing. There can be a large difference in the depth of investigation between the propagation-type resistivity tool 211 and the directional EM tool of the BHA 151 such that the short-spacing measurements of the directional EM tool do not resolve resistivity anisotropy at the resolution of the resistivity measurements of the propagation-type resistivity tool 211. In this case, the formation model that results from the first inversion look-around processing can be upscaled (coarsened) in order to account for the lower resolution of the measurements of the directional EM tool and the second inversion look-around processing associated therewith. Such upscaling can involve grouping multiple formation layers and assigning them to the same value for horizontal resistivity Rh and vertical resistivity Rv or resistivity anisotropy, derived from individual layer resistivities. The upscaled formation model can then be used as the initial formation model (or guess) for the second inversion look-around processing. Certain parts of the formation model used for the second inversion look-around processing (such as the layers, layer thicknesses and horizontal resistivity Rh values of this formation model) can be fixed to the corresponding values of the formation model that result from the first inversion look-around processing.

In embodiment(s), the second inversion look-around processing can involve an inversion (referred to as a "resistivity anisotropy inversion") that interprets measurements of the directional EM tool of the BHA 151 (which are sensitive to variation in directional anisotropic resistivity of the look-around zone 242) to determine a profile of the vertical resistivity Rv or resistivity anisotropy of one or more formation layers of the look-around zone 242. The upscaled formation model derived from the results of the first inversion look-around processing can be used as the initial formation model for the directional anisotropy inversion. Furthermore, initial values for the vertical resistivity Rv or resistivity anisotropy values of the formation layers of the formation model can be based on the vertical resistivity Rv or anisotropy values of the formation layers of the formation model as determined by the second inversion look-around processing for an earlier look-around zone of the formation. Certain parts of the formation model (such as the layers, layer thicknesses and horizontal resistivity Rh values) for the resistivity anisotropy inversion can be fixed to the corresponding values of the formation model that result from the first inversion look-around processing for the same look-around zone of the formation.

The second inversion look-around processing can further involve an inversion (referred to as a "dip inversion") that interprets measurements of the directional EM tool of the BHA 151 (which are sensitive to variation in formation dip of the look-around zone 242) to determine the formation dip of the look-around zone 242. The dip inversion can follow the resistivity anisotropy inversion. The upscaled formation model derived from the results of the first inversion look-around processing can be used as the initial formation model for the dip inversion. Furthermore, the initial dip of the formation layers of the formation model can be based on the formation dip of the formation layers of the formation model as determined by the second inversion look-around processing for an earlier look-around zone of the formation. Certain parts of the formation model (such as the layers, layer thicknesses and horizontal resistivity Rh values) for the dip inversion can be fixed to the corresponding values of the formation model that result from the first inversion look-around processing for the same look-around zone of the formation.

The second inversion look-around processing can further involve an inversion (referred to as a "resistivity anisotropy and dip inversion") that interprets measurements of the directional EM tool of the BHA 151 (which are sensitive to variations in both directional anisotropic resistivity and formation dip of the look-around zone 242) to determine formation dip and a profile of the vertical resistivity Rv or resistivity anisotropy of one or more formation layers of the look-around zone 242. The resistivity anisotropy and dip inversion can refine the formation dip and the profile of the vertical resistivity Rv or resistivity anisotropy of the look-around zone 242 as determined from the separate resistivity anisotropy inversion and the dip inversion. The results of the anisotropy inversion and the dip inversion can be used as the initial formation model for the anisotropy and dip inversion. Certain parts of the formation model (such as the layers, layer thicknesses and horizontal resistivity Rh values) used for the resistivity anisotropy and dip inversion can be fixed to the corresponding values of the formation model that result from the first inversion look-around processing for the same look-around zone of the formation.

The formation model that results from the second inversion look-around processing (or part(s) thereof) can be used in inversion look-ahead processing that characterizes the look-ahead zone 241. The inversion look-ahead processing can interpret certain measurements of the directional EM tool of the BHA 151 (which are sensitive to horizontal resistivity and directional anisotropic resistivity and formation dip of the look-ahead zone 241) to determine formation dip and a profile of the horizontal resistivity Rh, the vertical resistivity Rv or resistivity anisotropy and bed boundaries of one or more formation layers of the look-ahead zone 241. The measurements of the directional EM tool can be sensitive to boundaries when transmitter or receiver antennae cross them. In order to address this issue, in the region behind the last receiver outside the look-ahead inversion window (i.e., the look-behind zone 243), the profile of the formation layers of the formation model can be coarsened, keeping only the "significant" boundaries that contribute to the response. The resistivity profile is therefore segmented with a high threshold behind the last receiver position. Thus, in the region behind the last receiver position, where the response sensitivity is very low and the effect of formation boundaries in this region are removed from the look-ahead inversion processing. The look-ahead inversion processing can use a pixel-based or model-based approach as described herein. The formation dip and profile of horizontal resistivity Rh and vertical resistivity Rv or resistivity anisotropy of the one or more formation layers of the look-ahead zone 241 as determined from the inversion look-ahead processing can provide a full resistivity profile of the look-ahead zone 241 as well as position of bed boundaries of the look-ahead zone 241.

The resistivity profile of the look-ahead zone 241 as determined from the inversion look-ahead processing can be used to update a reservoir model or part thereof that corresponds to the look-ahead zone 241 for visualization and reservoir analysis and/or reservoir characterization. Furthermore, the resistivity profile of the look-ahead zone 241 as determined from the inversion look-ahead processing can be used to control operation (e.g., geo-stopping) of the drill bit.

In order to improve robustness, special care can be taken in the initialization of the formation model used for the second inversion look-around processing that characterizes the formation dip and anisotropic resistivity of the look-around zone 242. Specifically, the formation model use 0° initial dip (or some predefined value if available from other data) and an isotropic resistivity profile, since anisotropy and dip information are not available initially. The bounds of the refinement of the inversion can be relaxed because initial results may not be as reliable due to lack of sensitivity to anisotropy. Nevertheless, the inversion look-ahead inversion processing may be affected initially, but as the drilling progresses and new data are acquired, the workflow can automatically correct and improve the characterization of the look-around zone 242 as well as the characterization of the look-ahead zone 241.

FIGS. 4A-4C, collectively, is a flow chart of an illustrative formation modeling and inversion workflow that uses the LWD modules of the BHA 151 of FIG. 2A together with multistep look-around processing workflow that characterizes the current look-around zone 242 (which is the look-around zone 242 for the current location of the BHA 151) as well as look-ahead processing that characterizes the current look-ahead zone 241 (which is the look-ahead zone 241 for the current inversion station or location of the BHA 151) for real-time interpretation while drilling as the drill bit moves ahead. It is assumed that an earlier look-ahead zone (which is a look-ahead zone 241 for an earlier inversion station or location of the BHA 151) can be equated (or correspond) to the current look-around zone 242 based upon the movement of the BHA 151 through the formation 30 during drilling.

In block 401, shallow resistivity measurements (e.g., phase shift measurements) of the current look-around zone 242 and the current look-behind zone 243 (which is the look-behind zone for the current inversion station or location of the BHA 151) are acquired and processed by operation of the propagation-type resistivity tool 211 of the BHA 151 while drilling as the drill bit moves ahead. It is assumed that an earlier look-around zone (which is the look-around zone 242 for an earlier inversion station or location of the BHA 151) can be equated (or correspond) to the current look-behind zone 243 based upon the movement of the BHA 151 through the formation 30 during drilling.

In block 403, short-spacing (e.g., deep) and long-spacing (e.g., very deep) EM measurements at multiple frequencies for characterizing the profile of the current look-around zone 242, the current look-behind zone 243 and the current look-ahead zone 241 are acquired and processed by operation of the directional EM tool of the BHA 151 while drilling as the drill bit moves ahead. Examples of these short-spacing and long-spacing EM measurements are discussed above with respect to FIG. 2D. Note that lower frequencies and long-spacing EM measurements can be used to increase the depth of investigation of the directional EM tool and detect targets further ahead of the bit.

In block 405, a first formation model can be initialized for use in First Inversion Look-Around Processing (block 407). An example of a suitable first formation model is described above and illustrated in FIG. 3.

In certain instances (such as, when the results of look-around and look-ahead processing (block 419) for a corresponding earlier look-ahead zone are not available), the first formation model can be initialized with horizontal resistivity Rh values and layer boundaries determined from log-squaring of the resistivity measurements of the current look-around zone 242 and the current look-behind zone 241 of block 401. In one example, the log-squaring is based on certain phase shift measurements of the propagation-type resistivity tool 211 that correspond to a long segment of the formation that extends up to the maximum backward sensitivity of the propagation-type resistivity tool 211 plus the relative Tx position of the furthest EM measurement of the directional EM tool which is used for the resistivity anisotropy inversion. This ensures that the log-squaring takes into account the current look-behind and look-around zones of the formation. In accordance with some examples, the log-squaring involves interpolation of these phase shift measurements in this long segment using splines where inflection points may be used as boundary indicators. The maximum or the minimum of the phase shift measurements in this long segment may be used to compute the corresponding layer resistivity. If there is no extremum or if there are multiple extrema, the average value may be taken. Only inflection points with a significance number above a given threshold may be accepted in accordance with some examples. The significance threshold may be determined based on the measurement noise level. At the end, the phase shift measurements can be transformed to apparent resistivity, which can be equated to horizontal resistivity Rh in low deviation wells. In general, the log-squaring process can be sufficiently accurate estimate of the formation resistivity but there are several exceptions. First, the boundary positions may be wrong if the resistivity contrast is high. In this case, the log-squaring tends to detect multiple inflection points not coinciding with the true boundary position. Second, if the formation has a progressively increasing or decreasing resistivity profile, an inflection point may not be detected for every Rh step. Third, for thin layers with high contrast, the apparent resistivity does not read the true horizontal resistivity Rh and the apparent resistivity may be affected by the apparent dip and anisotropy, leading to Rh overestimation. In this case, correction may be useful.

In other circumstances (such as, when results of the inversion-based workflow from a corresponding earlier inversion station are available), the first formation model can be initialized with formation dip as well as horizontal resistivity Rh, vertical resistivity Rv or resistivity anisotropy values and layer boundaries obtained from the look-ahead processing (block 419) of the corresponding earlier look-ahead zone.

In both instances, the initialization of the first formation model can also be based on formation dip as well as horizontal resistivity Rh, vertical resistivity Rv or resistivity anisotropy values and layer boundaries obtained from the Look-Around Processing (block 413) of an earlier look-around zone.

In block 407, First Inversion Look-Around Processing is performed, which involves inversion of the shallow resistivity measurements of the current look-around zone 242 by the propagation-type resistivity tool 211 (block 401) that are sensitive to variation in resistivity of the current look-around zone 242. The inversion uses the first formation model and solves for the horizontal resistivity Rh values and layer boundaries of the current look-around zone 242. The formation dip and vertical resistivity Rv or resistivity anisotropy values of the first formation model remains fixed in this inversion. The solved-for first formation model provides a first resistivity profile of the current look-around zone 242, which can provide a sufficiently detailed profile of the horizontal resistivity Rh of the formation layer(s) of the current look-around zone 242 in most circumstances in vertical and low deviation wells.

In block 409, upscaling (coarsening) of the solved-for first formation model that results from the First Inversion Look-Around Processing (Block 407) can be performed to account for the lower resolution of Second Inversion Look-Around Processing (block 413). There can be a large difference in the depth of investigation between the propagation-type resistivity tool 211 and the directional EM tool of the BHA 151 such that the short-spacing measurements of the directional EM tool resolve resistivity anisotropy at a spatial resolution that is lower than the spatial resolution of the resistivity measurements of the propagation-type resistivity tool 211. In this case, the solved-for first formation model can be the upscaled (coarsened) in order to account for the lower spatial resolution of the measurements of the directional EM tool and the second inversion look-around processing associated therewith. Such upscaling can involve grouping multiple formation layers and assigning them the equivalent value for horizontal resistivity Rh and vertical resistivity Rv or resistivity anisotropy. The upscaled formation model may have an equal number (or less) anisotropy parameters than layers in the formation model. The upscaled formation model can then be used as the initial formation model (or guess) for the Second Inversion Look-Around Processing (block 413).

In block 411, a second formation model can be selected or initialized for use in the Second Inversion Look-Around Processing (block 413). An example of a suitable second formation model is described above and illustrated in FIG. 3.

In certain instances (such as, when the results of look-around and look-ahead processing (block 419) for a corresponding earlier look-ahead zone is not available), the upscaled first formation model produced in block 409 can be selected for use as the second formation model in Second Inversion Look-Around Processing (block 413).

In other instances (such as, when the results of look-around and look-ahead processing (block 419) for a corresponding look-ahead zone is available), the initialization of the second formation model can involve integrating the formation dip and the profile of vertical resistivity Rv or resistivity anisotropy values into the upscaled first formation model produced in block 409 where the formation dip and the profile of vertical resistivity Rv or resistivity anisotropy values are obtained from the characterization of the corresponding earlier look-ahead zone (block 419).

In block 413, Second Inversion Look-Around Processing is performed, which involves inversion of EM measurements of the current look-around zone 242 by the directional EM tool that are sensitive to variation in the resistivity anisotropy and the formation dip of the current look-around zone 242. The inversion uses the second formation model and solves for the dip and vertical resistivity Rv or anisotropy values of the current look-around zone 242. The layer thicknesses, and the horizontal resistivity Rh values of the second formation model remain fixed in this inversion. The solved-for second formation model provides a profile of the current look-around zone 242, which can provide a sufficiently detailed characterization of the formation dip and profile of the horizontal resistivity Rh, vertical resistivity Rv or resistivity anisotropy of the formation layer(s) of the current look-around zone 242 in most cases.

In block 415, a reservoir model (or parts thereof) of the current look-around zone can possibly be updated using the data of the solved-for second formation model (block 413) for visualization and reservoir analysis and/or reservoir characterization. Also, operation (e.g., geo-steering) of the drill bit can possibly be controlled based on the data of the solved-for second formation model (block 413).

In block 417, a third formation model can be selected or initialized for use in Inversion Look-Ahead Processing (Block 419). An example of a suitable third formation model is described above and illustrated in FIG. 3. The third formation model can be based on the solved-for second formation model that results from the Second Inversion Look-Around Processing (block 413) for the current look-around zone 242. For example, the solved-for second formation model produced in block 413 can be selected for use as the third formation model in the Inversion Look-Ahead Processing (block 419). In other example, the EM measurements of the directional EM tool can be sensitive to boundaries when transmitter or receiver antennae cross them. In order to address this issue, when constructing the initial third formation model, in the region behind the last receiver outside the look-ahead inversion window (i.e., the look-behind zone 243), the profile of the formation layers of the second formation model produced in block 413 can be coarsened, keeping only the "significant" boundaries that contribute to the response. The resistivity profile is therefore segmented with a high threshold behind the last receiver position. Thus, in the region behind the last receiver position, the response sensitivity is very low and the effect of formation boundaries in this region are removed from the look-ahead inversion processing.

In block 419, Inversion Look-Ahead Processing is performed, which involves inversion of EM measurements of the current look-ahead zone 241 by the directional EM tool that are sensitive to variation in horizontal resistivity Rh, resistivity anisotropy and formation dip of the look-ahead zone 241. In some embodiments, UHR measurements at all high frequencies of the directional EM tool are used in this inversion. The inversion uses the third formation model and solves for formation dip and a profile of the horizontal resistivity Rh, the vertical resistivity Rv or resistivity anisotropy and bed boundaries of the formation layer(s) of the third formation model. The solved-for third formation model can provide formation dip as well as a profile of dip, horizontal resistivity Rh, and vertical resistivity Rv or resistivity anisotropy of the formation layer(s) of the current look-ahead zone 241 as well as position of bed boundaries of the current look-ahead zone 241.

The Inversion Look-Ahead Processing (block 419) can use a pixel-based or model-based approach. In the pixel-based approach, the space from the propagation tool 211 up to, for example, two times the longest spacing is typically discretized (with pixel size gradually increasing), and the inversion is performed to solve for the horizontal resistivity Rh and resistivity anisotropy values of the pixels using Rh-anisotropy difference regularization. In the model-based approach, the number of layers ahead of the propagation-type resistivity tool 211 is defined and inversion is performed for the horizontal resistivity Rh, resistivity anisotropy and thickness for each layer using regularization. Noise effects can be reduced using the L-curve method. In both cases, multiple initial guesses can be generated to avoid local inversion minima and characterize the look-ahead zone. In some examples, the initial guesses can be based on i) the resistivity profile of an earlier look-ahead zone (block 419), ii) a homogeneous formation ahead of the propagation-type resistivity tool 211, and iii) a conductive or resistive layer close to and far from the transmitter of the directional EM tool. It should be understood that any suitable number of guesses may be utilized in accordance with some examples. The averaged solution of all initial guesses is then displayed to reduce possible noise artifacts and evaluate uncertainties. The formation resistivity profiles can be weighted with inversion error term in the averaging.

In block 421, a reservoir model (or part thereof) of the current look-ahead zone 241 can possibly be updated using the data of the solved-for third formation model (block 419) for visualization and reservoir analysis and/or reservoir characterization. Also, operation (e.g., geo-stopping) of the drill bit can possibly be controlled based on the data of the solved-for third formation model (block 419).

Figure 5:
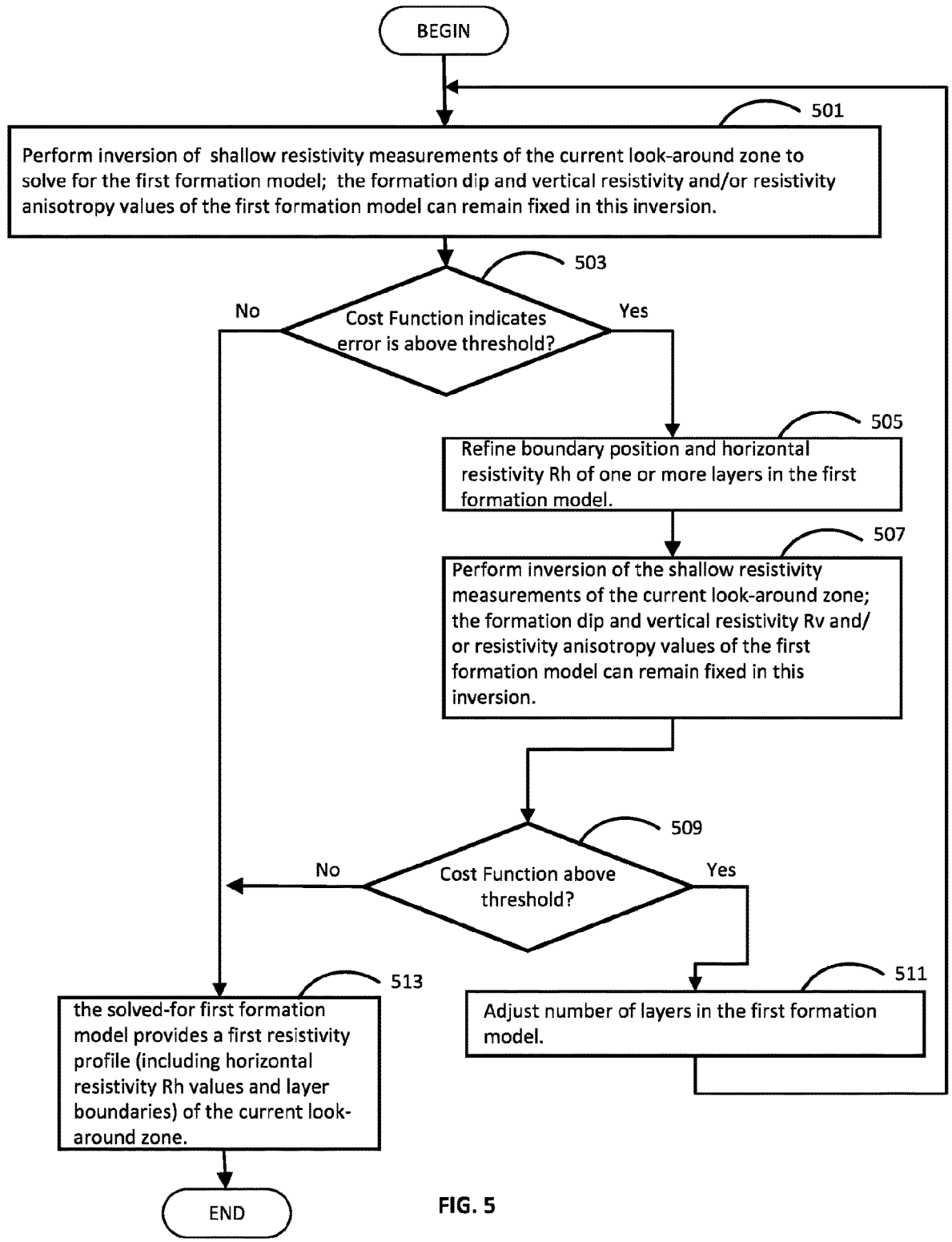
FIG. 5 is a flowchart illustrating exemplary operations that can be part of the First Inversion Look-Around Processing (block 407) of the workflow of FIGS. 4A-4C.

FIG. 5 is a flowchart illustrating exemplary operations that can be part of the First Inversion Look-Around Processing of block 407. The operations begin in block 501 where the first formation model is determined by inversion of shallow resistivity measurements of the current look-around zone 242 obtained by operation of the propagation resistivity tool 211 (block 401) that are sensitive to variation in resistivity of the current look-around zone 242. The dip and vertical resistivity or anisotropy values of the first formation model remain fixed in this inversion.

In block 503, a cost function generated by the inversion results of block 501 is evaluated to determine if the error is above a predefined threshold. In some examples, the cost function can be based on the discrepancy or mismatch between the measured and simulated shallow resistivity measurements of the current look-around zone 242. If not, the operations continue to block 513. If yes, the operations continue to block 505.

In block 505, the boundary positions and horizontal resistivity of one or more formation layers in the first formation model are refined or adjusted and the operations continue to block 507. In some examples, the first formation model can be refined by changing layer boundary position and layer horizontal resistivity Rh for layers where the error function (or discrepancy between the measured and simulated resistivity measurements of the current look-around zone 242) is high.

In block 507, the first formation model is again constructed by inversion of the shallow resistivity measurements of the current look-around zone obtained by operation of the propagation-type resistivity tool 211 (block 401) that are sensitive to variation in horizontal resistivity Rh of the current look-around zone 242. The formation dip and vertical resistivity or resistivity anisotropy values of the first formation model remain fixed in this inversion.

In block 509, a cost function generated by the inversion results of block 507 is evaluated to determine if the error is above a predefined threshold. In some examples, the cost function can be based on the discrepancy or mismatch between the measured and simulated resistivity measurements of the current look-around zone 242. If not, the operations continue to block 513. If yes, the operations continue to block 511.

In block 511, the number of layers in the first formation model can be adjusted. In some examples, the first formation model can be refined by splitting the layers for zones where the error function (or discrepancy between the measured and simulated resistivity measurements of the current look-around zone 242) is high. The operations then return to block 501 to perform another iteration of the inversion process.

In block 513, the iterative process of the First Inversion Look-Around Processing ends and the solved-for first formation model provides a first resistivity profile (including horizontal resistivity Rh values and layer boundaries) for the formation layers of the current look-around zone 242.

Figure 6A:
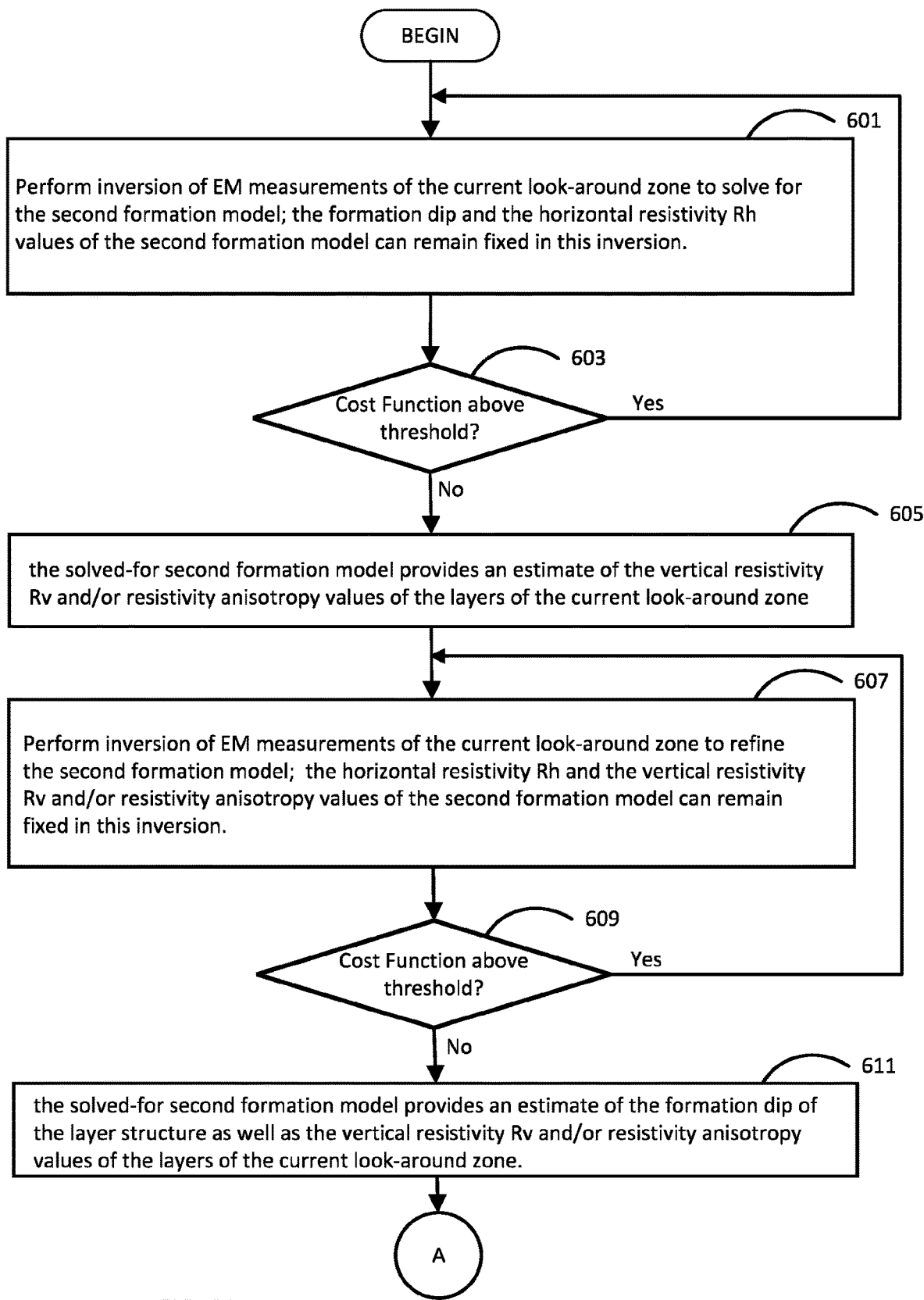
FIGS. 6A and 6B, collectively, is a flowchart illustrating exemplary operations that can be part of the Second Inversion Look-Around Processing (block 413) of the workflow of FIGS. 4A-4C.
Figure 6B:
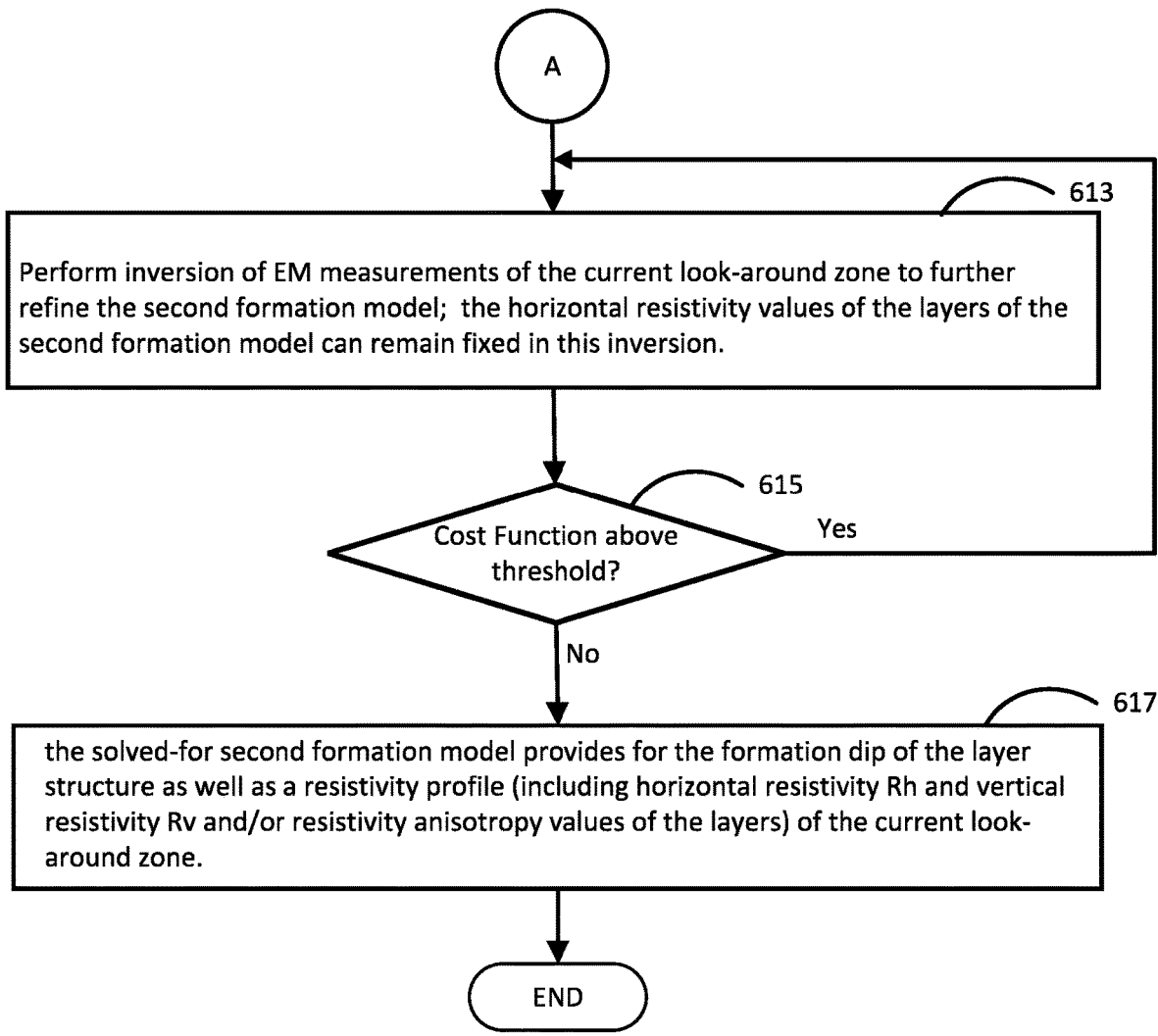

FIGS. 6A and 6B, collectively, is a flowchart illustrating exemplary operations that can be part of the Second Inversion Look-Around Processing of block 413.

The operations begin in block 601 where the second formation model is constructed using inversion of EM measurements of the current look-around zone 242 obtained by operation of the directional EM tool (block 403). These EM measurements are sensitive to variation in the resistivity anisotropy of the current look-around zone 242. The horizontal resistivity Rh values and dip of the second formation model remains fixed in this inversion. In some embodiments, UHR ("harmonic resistivity") measurements of directional EM tool at different high frequencies mostly sensitive to variation in resistivity anisotropy on the window corresponding to the short-spacing length of the directional EM tool are used in this inversion. This window can start at ⅔*L1 behind the current transmitter position (where L1 is the long window of the directional EM tool) to reduce the influence of the formation ahead of transmitter (Tx) of the directional EM tool.

In block 603, a cost function generated by the inversion results of block 601 is evaluated to determine if the corresponding error is above a predefined threshold. In some examples, the cost function can be based on the discrepancy or mismatch between the measured and simulated EM measurements of the current look-around zone 242 by the directional EM tool. If not, the operations adjust one or more vertical resistivity Rv or anisotropy values of the second formation model and the inversion of block 601 is repeated. If yes, the operations continue to block 605 where the solved-for second formation model provides an estimate of the vertical resistivity Rv or resistivity anisotropy values of the formation layers of the current look-around zone 242 and the operations continue to block 607.

In block 607, the solved-for second formation model (block 605) is refined using inversion of EM measurements of the current look-around zone 242 obtained by operation of the directional EM tool (block 403). These EM measurements (such as UAD1, USD1) are sensitive to variation in dip of the current look-around zone 242. The horizontal resistivity Rh and the vertical resistivity Rv or anisotropy values of the second formation model remains fixed in this inversion. In some embodiments, anti-symmetrized (UAD) and symmetrized (USD) measurements at different high frequencies mostly sensitive to variation in dip on the window corresponding to the short-spacing length of the directional EM tool are used in the inversion. This window can start at ⅔*L1 behind the current transmitter position (where L1 is the short spacing of the directional EM tool) to reduce the influence of the formation ahead of transmitter of the directional EM tool.

In block 609, a cost function generated by the inversion results of block 607 is evaluated to determine if the error is above a predefined threshold. In some examples, the cost function can be based on the discrepancy or mismatch between the measured and simulated EM measurements of the current look-around zone 242. If not, the operations adjust the dip of the second formation model and the inversion of block 607 is repeated. If yes, the operations continue to block 611 where the solved-for second formation model provides an estimate of the formation dip of the layer structure of the current look-around zone 242 and the operations continue to block 613.

In block 613, the solved-for second formation model (block 611) is refined using inversion of EM measurements of the current look-around zone 242 obtained by operation of the directional EM tool (block 403). These EM measurements (such as UHR1, UAD1, USD1) are sensitive to variation in both dip and anisotropic resistance of the current look-around zone 242. The horizontal resistivity of the second formation model remains fixed in this inversion. In some embodiments, UHR measurements, UAD measurements, and USD measurements at different high frequencies and sensitive to variation in both dip and resistivity anisotropy over an extended window can be utilized in this inversion. In one example, the extended window corresponds to the length of the directional EM tool from L1/3 to 5L1/3 behind the current transmitter position (where L1 is the short spacing of the directional EM tool). Because measurements closer to the transmitter of the directional EM tool are used, the resistivity profile can be augmented with the inversion results for a corresponding earlier look-ahead zone (block 419) to account for the effects of the formation ahead. The dip and vertical resistivity Rv or resistivity anisotropy values of the second formation model are inverted. To avoid a local minimum, an additional inversion with different starting point can be added to the inversion of block 613, with the dip taken from the dip inversion and assuming a value of 1.2 for all layer anisotropies in this example.

In block 615, a cost function generated by the inversion results of block 613 is evaluated to determine if the error is above a predefined threshold. In some examples, the cost function can be based on the discrepancy or mismatch between the measured and simulated EM measurements of the current look-around zone 242. If not, the operations adjust the dip and/or the vertical resistivity Rv or anisotropy values of the second formation model and the inversion of block 613 is repeated. If yes, the operations continue to block 617 where the solved-for second formation model provides formation dip as well as the vertical resistivity or resistivity anisotropy values of the formation layers of the current look-around zone 242. The solved-for second formation model can be selected from multiple solutions where the solved-for second formation model has a lower residual.

Note that in some embodiments, the resistivity anisotropy inversion (blocks 601-605) and the dip inversion (blocks 607-611) can be omitted. In this case, the resistivity anisotropy and dip inversion (blocks 613-617) provides the complete resistivity anisotropy and dip inversion that characterizes the anisotropic resistance and dip of the formation layers of the current look-around window 242.

Figure 7:
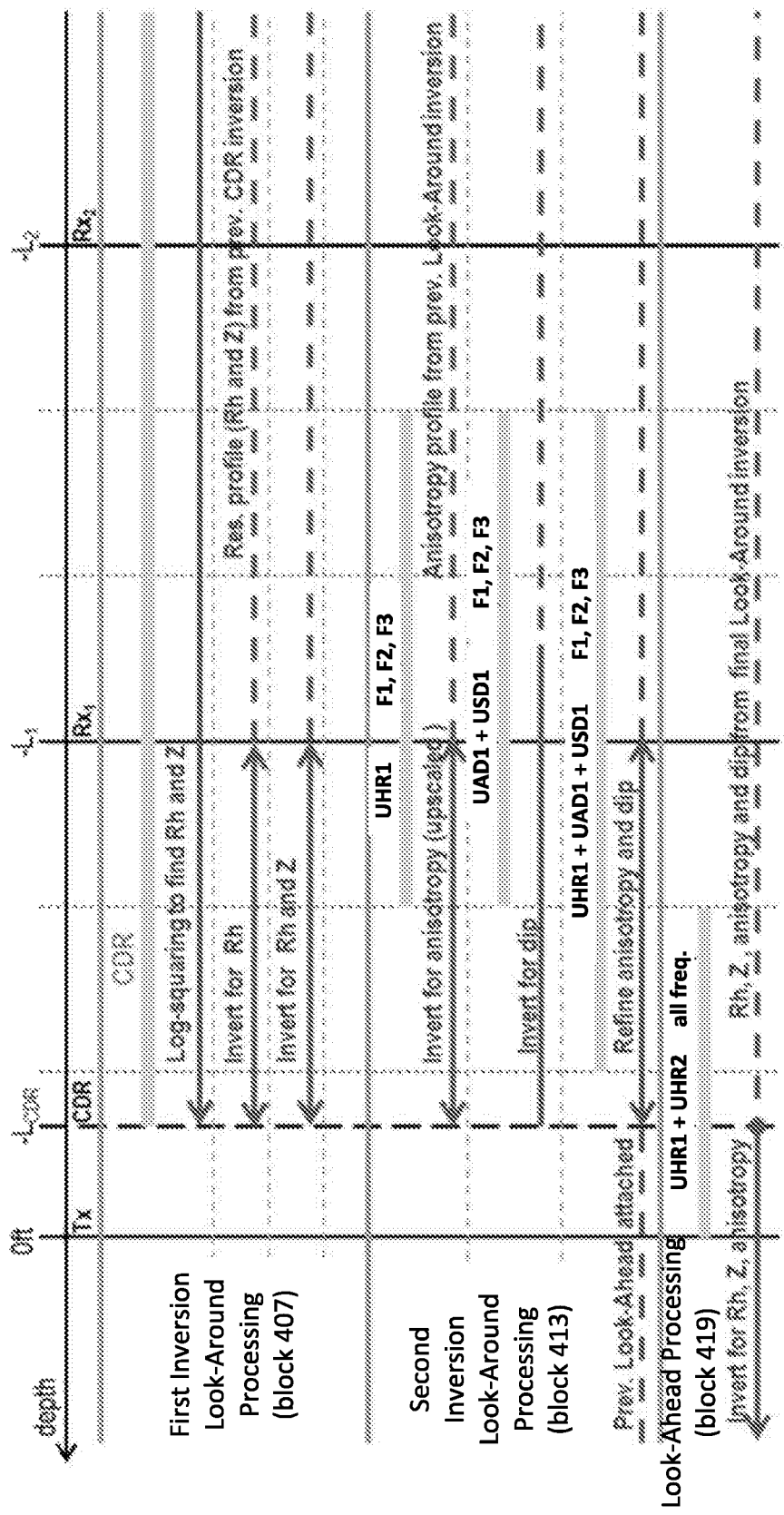
FIG. 7 is a graphical representation of an exemplary workflow that uses the LWD modules of the bottom-hole assembly of FIG. 2A together with a multistep look-around processing workflow that characterizes the current look-around zone as well as look-ahead processing that characterizes the current look-ahead zone.

FIG. 7 is a graphical representation of an exemplary workflow that uses the LWD modules of the BHA 151 of FIG. 2A together with multistep look-around processing workflow that characterizes the current look-around zone as well as look-ahead processing that characterizes the current look-ahead zone, which is similar to the operations described above with respect to FIGS. 4A-4C, 5 and 6A-6B. The processed measurement data window of the propagation-type resistivity tool (CDR tool) relative to the transmitter subassembly 210 of the directional EM tool is shown in a wide solid gray line, and the processed windows of the various EM measurements of the directional EM tool relative to the transmitter subassembly 210 of the directional EM tool is shown in three distinct wide solid gray lines. The formation zones being characterized using the inversions of the look-around processing (blocks 407 and 413) and of the look-ahead processing (block 419) are specified by black arrows. Note that the EM measurements (e.g., UAD1, UAD2, USD1, USd2, UHR1, UHR2) are designated with reference numerals 1 or 2 that correspond to the receiver ID that acquires the respective EM measurements.

FIG. 8 is a chart that illustrates how dip and anisotropy affect the apparent resistivity $R_C$DR and therefore estimate of the horizontal resistivity Rh by the first inversion look-around processing (block 407) of FIGS. 4A-4C and 5. Values are shown for the phase shift response measured by the 2 MHz CDR tool in a homogeneous formation with Rh=51 Ωm. The error in Rh progressively increases with the dip or anisotropy so at 20° dip with anisotropy of 5, the error is 5%. This error may be sufficient to affect the look-ahead interpretation if not corrected. However, at a relative dip above 30°, the difference between measured apparent resistivity and the true Rh increases and responses are more sensitive to small changes in the dip or anisotropy.

The First Inversion Look-Around Processing (block 407) can be configured to account for higher relative dip of the formation layers. Specifically, ignoring anisotropy in the First Inversion Look-Around Processing (block 407) may lead to more significant overestimates of the horizontal resistivity Rh values of the formation layers at high relative dip. To overcome this limitation, the First Inversion Look-Around Processing may be iterated using the dip and anisotropies derived from Second Inversion using directional EM (block 411) such that it converges to the true formation horizontal resistivity Rh values of the formation layers, but this may be time-consuming and potentially unstable. In another example, the dip and anisotropy dependence of the phase shift measurements of the propagation tool can be taken into account inside the First Inversion Look-Around Processing.

Figure 9A:
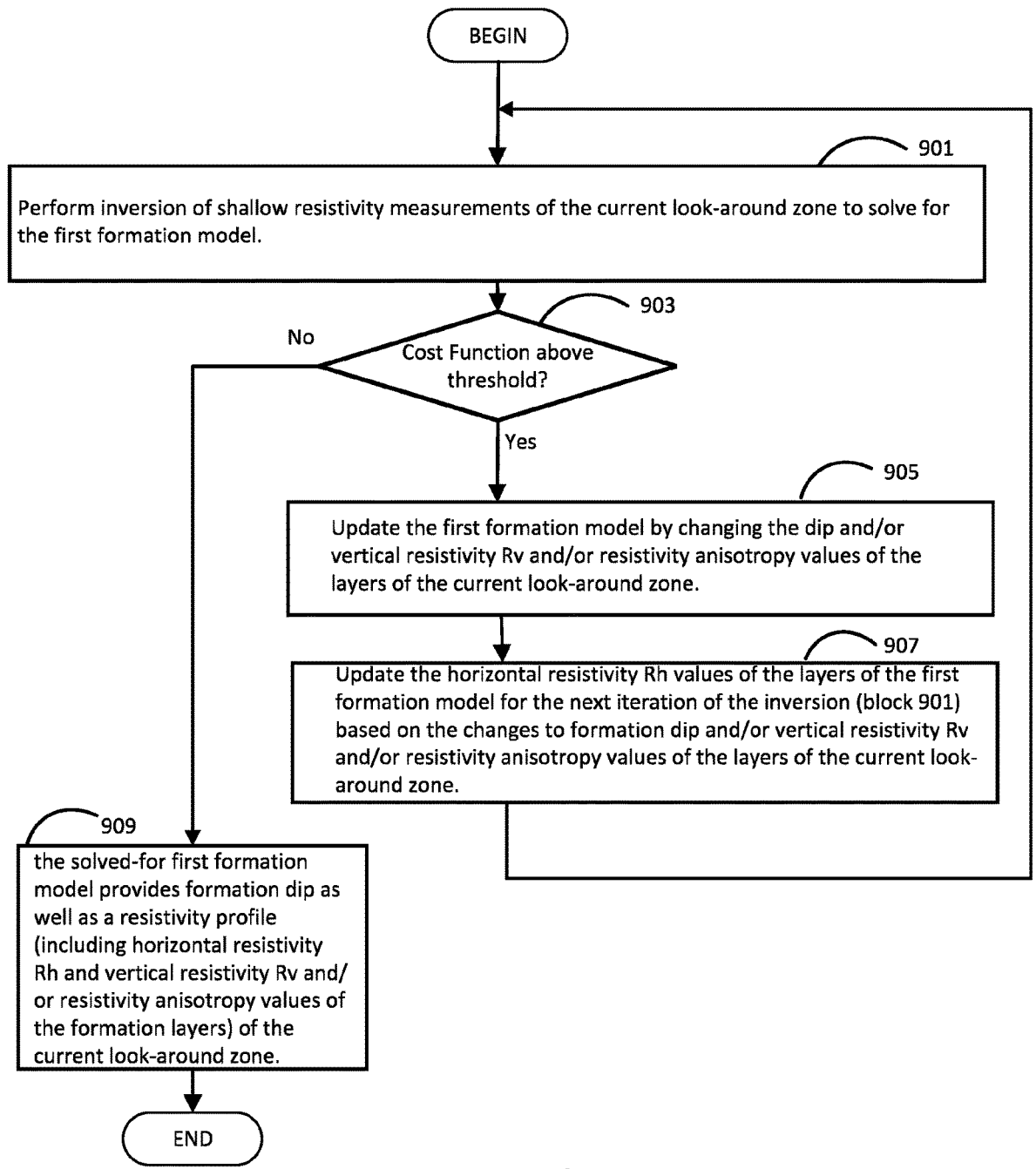
FIG. 9A is a flowchart illustrating exemplary operations that can be part of the First Inversion Look-Around Processing (e.g., block 407) and used to account for higher relative formation dip.

FIG. 9A is a flowchart illustrating exemplary operations that can be part of the First Inversion Look-Around Processing (block 407) and used to account for higher relative formation dip. In this example, a lookup table (similar to the table of FIG. 8) or other suitable data processing construct can be provided that tabulates dependence of the apparent resistivity measured by the propagation-type resistivity tool to dip, anisotropy and horizontal resistivity Rh for a homogeneous formation or a 1D EM simulator can be used to model the tool responses for the dipping anisotropic formation model. The operations begin in block 901 where the first formation model (which is initialized in block 405) is constructed using inversion of resistivity measurements of the current look-around zone 242 obtained by operation of the propagation-type resistivity tool 211 that are sensitive to variation in shallow resistivity of the current look-around zone 242.

In block 903, a cost function generated for the inversion results of block 901 is evaluated to determine if the error is above a predefined threshold. In some examples, the cost function can be based on the discrepancy or mismatch between the measured and simulated resistivity measurements of the current look-around zone 242. If so, the operations continue to block 909. If not, the operations continue to blocks 905 and 907.

In block 905, the formation dip and/or the vertical resistivity or the resistivity anisotropy of the formation layers of the second formation model can be updated.

In block 907, the apparent resistivity (or the equivalent phase shift measurement) as measured by the propagation-type resistivity tool for each formation layer of the current look-around zone 242 is passed to the look-up table or other data processing construct, which is used to lookup the horizontal resistivity Rh value that corresponds to the measured apparent resistivity (or the equivalent 2 MHz or 400 kHz phase shift or attenuation measurement) and to the updated dip and/or anisotropic resistivity of the formation layer as represented by the appropriate entry of the lookup table or data processing construct. Furthermore, the updated horizontal resistivity values identified by the table lookup as well as the updated dip and/or the updated vertical resistivity or the updated resistivity anisotropy of the formation layers (block 905) are used to update the first formation model and the inversion of block 901 is repeated.

In block 909, the solved-for first formation model provides formation dip as well as the horizontal resistivity Rh and vertical resistivity Rv or resistivity anisotropy values of the formation layers of the current look-around zone 242. In this manner, the First Inversion Look-Around Processing of FIG. 9 employs an inversion that initially has no anisotropy and dip information. However, the inversion is repeated (for example, multiple times) until it converges to the correct dip and anisotropic resistance of the formation layers of the current look-around zone, in accordance with some examples.

In some examples, the First Inversion Look-Around Processing of FIG. 9A may be suitable as long as the initialization of the first formation model (which can use log-squaring as described above) produces a reasonable estimate of the boundary positions and the apparent resistivities are not significantly affected by the shoulder-based effect. At relative dip angles above about 60°, the measurements of the propagation-type resistivity tool 211 may become more sensitive to shoulder bed effect and polarization horns on resistivity may render the log-squaring process unsuitable for initialization of the first formation model. In this case, other resistivity data can be used to initialize the first formation model.

In other examples, such as at higher dip inclinations, it may be suitable to scale all window lengths and distances to reflect true vertical depth (TVD) instead of measured depth (MD), i.e., divide them by cos θ, where θ is the inclination. Note that MD corresponds to the depth as a length measured along the borehole.

Figure 9B:
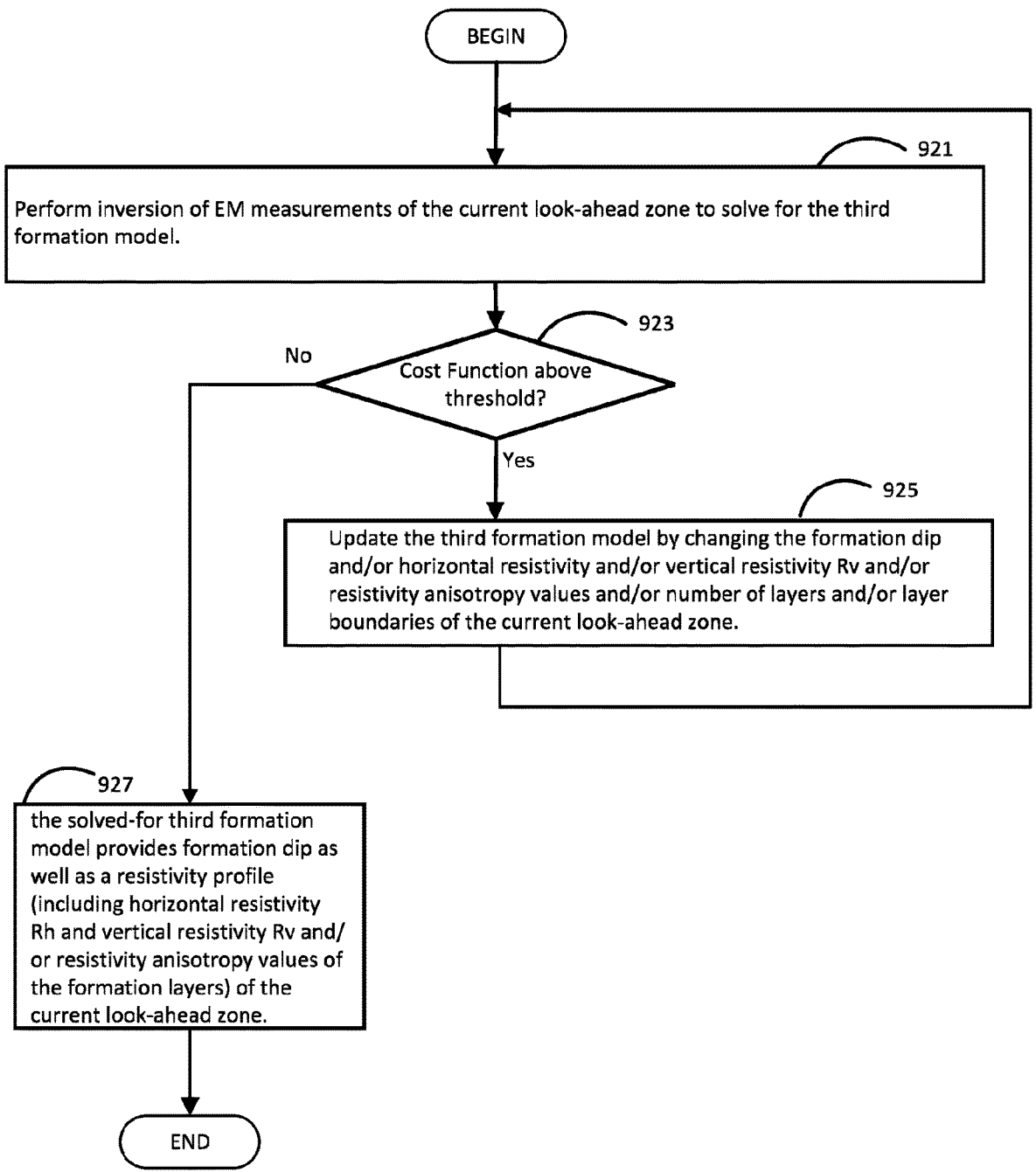
FIG. 9B is a flowchart illustrating exemplary inversion operations that can be part of the Inversion Look-Ahead Processing (e.g., block 419) of the workflows described herein.

FIG. 9B is a flowchart illustrating exemplary inversion operations that can be part of the Inversion Look-Ahead Processing (e.g., block 419) of the workflows described herein. In this workflow, the inversion operations of block 921 inverts the EM measurements of the current look-ahead zone to simultaneously solve for formation dip as well as the resistivity profile (including horizontal resistivity Rh and vertical resistivity Rv (or resistivity anisotropy) values for the formation layers) of the current look-ahead zone. The EM measurements of the current look-ahead zone that are sensitive to horizontal resistivity Rh and vertical resistivity Rv (or resistivity anisotropy) and formation dip of the current look-ahead zone can be used in the inversion operations of block 921. Single step and multistep inversions can be performed as part of block 921.

Figure 9C:
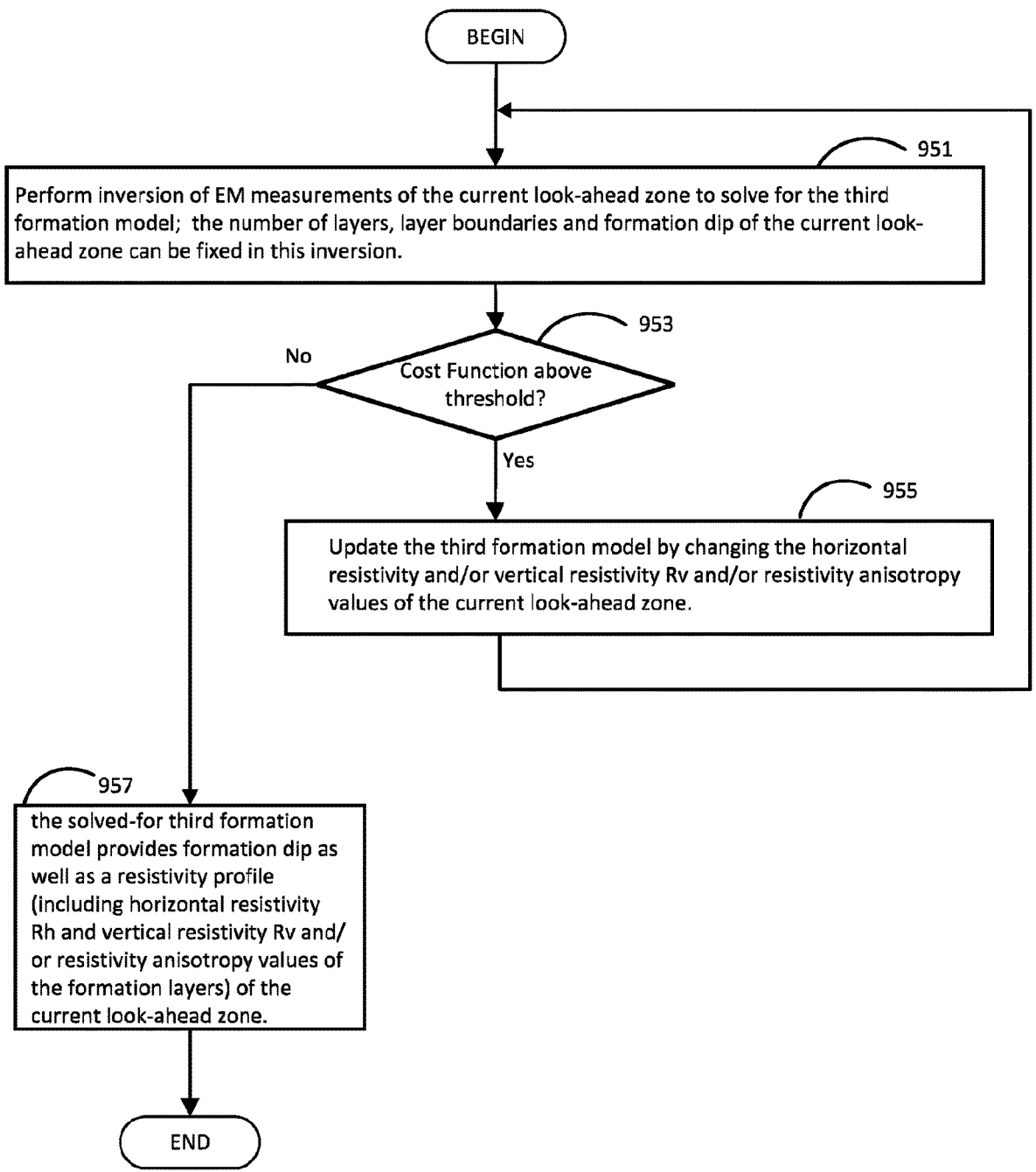
FIG. 9C is a flowchart illustrating other exemplary inversion operations that can be part of the Inversion Look-Ahead Processing (e.g., block 419) of the workflows described herein.

FIG. 9C is a flowchart illustrating exemplary inversion operations that can be part of the Inversion Look-Ahead Processing (e.g., block 419) of the workflows described herein. In this workflow, the inversion operations of block 951 inverts the EM measurements of the current look-ahead zone to solve for the resistivity profile (including horizontal resistivity Rh and vertical resistivity Rv (or resistivity anisotropy) values for the formation layers) of the current look-ahead zone. The number of layers, layer boundaries and formation dip of the current look-ahead zone can be fixed in the inversion operations of block 951. The formation dip of the current look-ahead zone can be taken from the formation dip of a look-around zone or elsewhere. The EM measurements of the current look-ahead zone that are sensitive to horizontal resistivity Rh and vertical resistivity Rv (or resistivity anisotropy) of the current look-ahead zone can be used in the inversion operations of block 951. Single step and multistep inversions can be performed as part of block 951.

Figure 10:
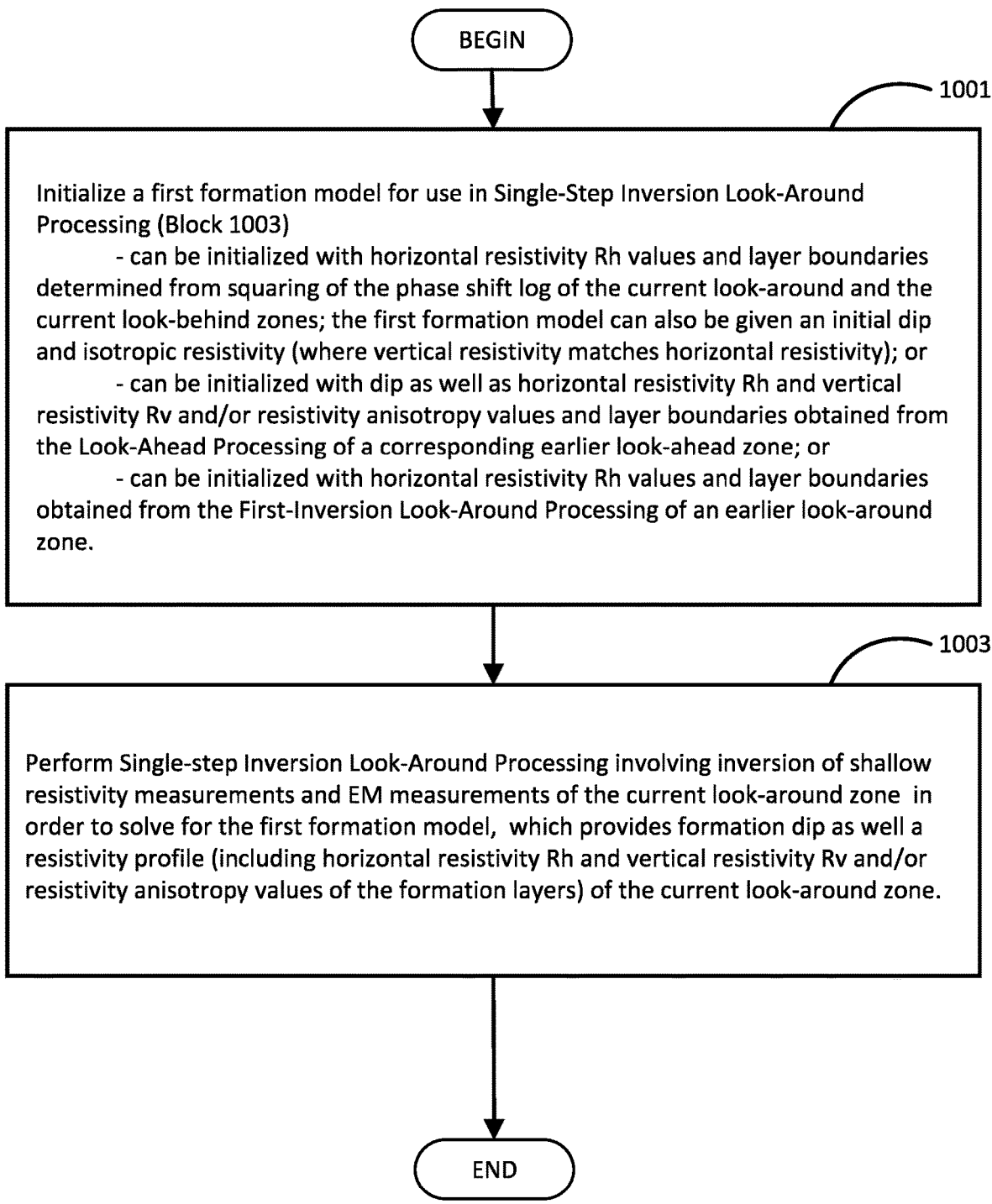
FIG. 10 is a flowchart illustrating a single-step inversion workflow that characterizes the current look-around zone.

FIG. 10 is a flowchart illustrating a single-step inversion workflow that characterizes the look-around zone. This workflow can substitute operations for the First and Second Inversion Look-Around Processing (blocks 405 to 413). The workflow begins in block 1001 where a first formation model is initialized for use in Single-Step Inversion Look-Around Processing (Block 1003).

In certain instances, the first formation model can be initialized with Rh values and layer boundaries determined from log-squaring of resistivity measurements of the current look-around and the current look-behind zones by the propagation-type resistivity tool. The first formation model is also given an initial dip and isotropic resistivity (where vertical resistivity matches horizontal resistivity) for all layers, In other instances, the first formation model can be initialized with dip as well as horizontal resistivity Rh values and vertical resistivity Rv values or resistivity anisotropy values and layer boundaries obtained from the Look-Ahead Processing (block 419) of a corresponding earlier look-ahead zone. The initialization of the first formation model can also be based on the horizontal resistivity Rh values and layer boundaries obtained from the First-Inversion Look-Around Processing (block 1003) of an earlier look-around zone.

In block 1003, Single-step Inversion Look-Around Processing is performed, which involves construction of the first formation model using inversion of measurements of the current look-around zone 242 obtained by operation of both the propagation-type resistivity tool 211 and the directional EM tool. The measurements of the propagation-type resistivity tool 211 and the directional EM tool are sensitive to variation in dip, horizontal resistivity Rh and directional anisotropic resistance of the current look around zone 242. This inversion solves for formation dip as well as horizontal resistivity Rh values and vertical resistivity Rv values or resistivity anisotropy values of the formation layers of the first formation model. The solved-for first formation model provides formation dip and a resistivity profile of the current look-around zone, which can provide a sufficiently detailed profile of horizontal resistivity Rh and vertical resistivity Rv or resistivity anisotropy values of the formation layers of the current look-around zone 242.

The inversion of block 1003 may be performed using a pixel-based approach or a model-based approach. In the pixel-based approach, the formation is discretized into fine pixel layers (e.g., smaller than 0.5 m, or any other suitable size). An inversion solves for formation dip as well as horizontal resistivity Rh and/or vertical resistivity Rv or resistivity anisotropy for each pixel using the measurements of the propagation-type resistivity tool and the EM measurements (preferably short spacing high frequency deep directional measurements) of the directional EM tool. The inversion can employ regularization on the horizontal resistivity Rh and resistivity anisotropy differences in accordance with some examples. In the model-based approach, the initial formation model can be based on the log-squaring process (as described above). An inversion solves for formation dip as well as horizontal resistivity Rh and/or vertical resistivity Rv or resistivity anisotropy values for the layers of the formation model using the measurements of the propagation resistivity tool and the EM measurements (preferably short spacing high frequency deep directional measurements) of the directional EM tool. Both the pixel-based approach and the model-based approach to the single-step look-around inversion do not require adjustments for high relative dip because the dip and anisotropy coupling of the phase shift measurements of the propagation tool is automatically taken into account.

FIGS. 11A-11C, collectively, is a flowchart illustrating a workflow that characterizes the current look-around zone 242 and the current look-ahead zone 241 using only EM measurements of the directional EM tool. In this case, the propagation tool 211 can be omitted from the BHA 151, and the current look-ahead zone 241 can extend ahead of the transmitter subassembly 210 of the directional EM tool and can extend ahead of the drill bit 212. The current look-around zone 242 extends from behind the transmitter subassembly 210 of the directional EM tool to the farthest receiver subassembly 209 (taking the look-ahead inversion window length into account). And the current look-behind zone 243 extends behind the farthest receiver subassembly 209 (with regard to the direction of bit travel during drilling).

The workflow begins in block 1101 where the directional EM tool short-spacing and long-spacing EM measurements are acquired at multiple frequencies and processed to characterize the current look-around zone, the current look-behind zone and the current look-ahead zone.

In block 1103, a first formation model is initialized for use in First Inversion Look-Around Processing (Block 1105).

In certain instances, the first formation model can be initialized with Rh values and layer boundaries for known data, an initial dip and isotropic resistivity (where vertical resistivity matches horizontal resistivity) for all layers.

In other instances, the first formation model can be initialized with Rh values, layer boundaries, dip and vertical resistivity or anisotropy values obtained from the Look-Ahead Processing (block 1115) of a corresponding earlier look-ahead zone. The initialization of the first formation model can also be based on the formation dip as well as the horizontal resistivity Rh and vertical resistivity Rv or resistivity anisotropy values and layer boundaries obtained from the Look-Around Processing (block 1109) of an earlier look-around zone.

In block 1105, the First Inversion Look-Around Processing is performed, which involves inversion of the first formation model using EM measurements of the current look-around zone 242 by the directional EM tool (block 1101) that are sensitive to variation in horizontal resistivity Rh and vertical resistivity Rv or resistivity anisotropy of the current look-around zone 242. In embodiments, the EM measurements that are sensitive to variation in horizontal resistivity Rh and vertical resistivity Rv or resistivity anisotropy of the current look-around zone 242 include the UHR short spacing measurements (e.g., UHR1) of the directional EM tool. The inversion solves for the horizontal resistivity Rh and vertical resistivity Rv or resistivity anisotropy values and layer boundaries of the current look-around zone 242. The formation dip value of the first formation model remains fixed in this inversion. The solved-for first formation model provides a first resistivity profile of the current look-around zone 242, which can provide a sufficiently detailed profile of the horizontal resistivity Rh and vertical resistivity Rv or resistivity anisotropy of the formation layers of the current look-around zone 242.

In block 1107, a second formation model can be selected or initialized for use in Second Inversion Look-Around Processing (Block 1109). The initialization of the second formation model can be based on the solved-for first formation model (Block 1105). When the resistivity profile of a corresponding earlier look-ahead zone is available from an earlier Look-Ahead processing (block 1115), the initialization of the second formation model can involve integrating a formation dip value into the second formation model where the dip value is obtained from the profile of the earlier look-ahead zone.

In block 1109, the Second Inversion Look-Around Processing is performed, which involves inversion of EM measurements of the current look-around zone 242 (block 1101) that are sensitive to variation in formation dip of the current look-around zone 242. In embodiments, the EM measurements that are sensitive to variation in formation dip of the current look-around zone 242 include the USD and UAD short spacing measurements (e.g., USD1 and UAD1) of the directional EM tool. This inversion solves for the second formation model, which includes a formation dip value of the current look-around zone 242. The layers, the layer thicknesses, and the horizontal resistivity Rh and vertical resistivity Rv or resistivity anisotropy values of the second formation model remains fixed in this inversion. The solved-for second formation model provides for formation dip as well as a resistivity profile (including horizontal resistivity Rh, vertical resistivity Rv or resistivity anisotropy values of the formation layers) of the current look-around zone 242.

In block 1111, a reservoir model (or parts thereof) of the current look-around zone 242 can possibly be updated using the data of the solved-for second formation model (block 1109) for visualization and/or reservoir analysis and/or reservoir characterization. Also, operation (e.g., geo-steering) of the drill bit can possibly be controlled based on the data of the solved-for second formation model (block 1109).

In block 1113, a third formation model is selected or initialized for use in Inversion Look-Ahead Processing (Block 1115). The selection or initialization of the third formation model can be based on the solved-for second formation model that results from the Second Inversion Look-Around Processing for the current look-around zone 242 (Block 1109). The EM measurements of the directional EM tool can be sensitive to boundaries when transmitter or receiver antennae cross them. In order to address this issue, when constructing the initial third formation model, in the region behind the last receiver outside the look-ahead inversion window (i.e., the look-behind zone 243), the profile of the formation layers can be coarsened, keeping only the "significant" boundaries that contribute to the response. The resistivity profile is therefore segmented with a high threshold behind the last receiver position. Thus, in the region behind the last receiver position, the response sensitivity is very low and the effect of formation boundaries in this region are removed from the look-ahead inversion processing.

In block 1115, the Inversion Look-Ahead Processing is performed, which involves inversion of the third formation model using EM measurements of the current look-ahead zone 241 that are sensitive to variation in the horizontal resistivity Rh and vertical resistivity Rv or resistivity anisotropy as well as formation dip of the current look-ahead zone 241. In some embodiments, UHR measurements at all high frequencies supported by the directional EM tool are used in this inversion. The inversion solves for horizontal resistivity Rh and/or vertical resistivity Rv or resistivity anisotropy values as well as the formation dip of the current look-ahead zone 241. The solved-for third formation model can provide a profile of formation dip, horizontal resistivity Rh, and vertical resistivity Rv or resistivity anisotropy of the formation layer(s) of the current look-ahead zone 241 as well as position of bed boundaries of the current look-ahead zone 241.

The Inversion Look-Ahead Processing (block 1115) can use a pixel-based or model-based approach. In the pixel-based approach, the look-ahead space is discretized (with pixel size gradually increasing), and the inversion is performed to solve for the pixel horizontal resistivity Rh and resistivity anisotropy values of the pixels using Rh and anisotropy difference regularization. In the model-based approach, the number of layers of the look-ahead zone is defined and inversion is performed for the horizontal resistivity Rh, resistivity anisotropy and thickness for each layer using regularization. Noise effects can be reduced using the L-curve method. In both cases, multiple initial guesses can be generated to avoid local inversion minima and characterize the look-ahead zone. In some examples, the initial guesses can be based on i) the profile of an earlier look-ahead zone (block 1115), ii) a homogeneous formation ahead of the directional EM tool, and iii) a conductive or resistive layer close to and far from the transmitter of the directional EM tool. It should be understood that any suitable number of guesses may be utilized in accordance with some examples. The averaged solution of all initial guesses is then displayed to reduce noise artifacts and evaluate uncertainties. The formation profiles can be weighted with inversion error term in the averaging.

In block 1117, a reservoir model (or part thereof) of the current look-ahead zone 241 can possibly be updated using the data of the solved-for third formation model (block 1115) for visualization and reservoir analysis. Also, operation (e.g., geo-steering and/or geo-stopping) of the drill bit can possibly be controlled based on the data of the solved-for third formation model (block 1115).

In other embodiments, the multistep inversion look-around processing of blocks 1105-1109 can be substituted with single-step Inversion Look-Around Processing, which involves construction of the first formation model by inversion of EM measurements of the current look-around zone 242 (block 1101) that are sensitive to variation in the horizontal resistivity Rh and vertical resistivity Rv or resistivity anisotropy as well as formation dip of the current look-around zone 242. This inversion solves for horizontal resistivity Rh and vertical resistivity Rv or anisotropy values as well as the formation dip of the formation layers of the current look-around zone 242. The solved-for first formation model provides a profile of the current look-around zone 242, which can provide a sufficiently detailed profile of the formation dip and horizontal resistivity Rh and vertical resistivity Rv or anisotropy values of the formation layers of the current look-around zone 242.

In yet other embodiments, the BHA 151 can employ a laterolog resistivity imaging tool that is used in place of the propagation-type resistivity tool, which is not sensitive to resistivity anisotropy in low deviation wells. In this case, the resistivity measurements of the laterolog resistivity imaging tool can be interpreted as part of the look-around-look-ahead workflow as described herein.

In still other embodiments, the BHA 151 can employ a triaxial resistivity tool that is used in place of the propagation-type resistivity tool, which is not sensitive to resistivity anisotropy in low deviation wells. In this case, the resistivity measurements of the triaxial resistivity tool can be interpreted as part of the look-around-look-ahead workflow as described herein. In this case, multistep inversions can be used as part of the Look-Around processing where the first inversion inverts the resistivity measurements of the triaxial resistivity tool to solve for the horizontal resistivity Rh and vertical resistivity Rv or resistivity anisotropy values of the layers of the look-around zone (with a fixed formation dip). The second inversion inverts the resistivity measurements of the triaxial resistivity tool to solve for the formation dip of the layers of the look-around zone. In still other embodiments, a single step inversion can be used as part of the Look-Around processing where the inversion inverts the resistivity measurements of the triaxial resistivity tool to solve for the formation dip as well as the horizontal resistivity Rh and vertical resistivity Rv or resistivity anisotropy values of the layers of the look-around zone. In both case, the short spacing and long spacing EM measurements of directional EM tool need not be used to characterize the resistivity profile of the look-around zone, but are used to characterize the profile of the look-ahead zone.

Note that the workflows as described herein can be performed in real-time at multiple locations (sometimes referred to as "measurement stations") along the wellbore while drilling in order to model (characterize) the look-around zone and look-ahead zone of the formation in real-time as the drilling advances through the formation. Such real-time modeling can be used to provide for real-time geo-steering of the drill bit and real-time visualization of the formation as the drilling advances through the formation.

Simulation Results

FIGS. 12A-12B, 13A-13B, 14A-14B, 15A-15B, 16, 17A-17B, 18, 19A-19B, and 20A-20B are provided to aid in visualizing the results of the workflows described herein. FIGS. 12A-12B, 13A-13B, 14A-14B, 15A-15B, 17A-17B, 19A-19B, and 20A-20B are tracking displays, which are of the same type as those described in detail in U.S. Pat. No. 8,862,405, which is incorporated herein by reference in its entirety. FIGS. 12A, 13A, 14A, 15A, 17A, 19A and 20A are Rv/Rh anisotropy ratio maps. The thin column/panel to the right of the respective Rv/Rh anisotropy ratio map corresponds to the values used in the synthetic model (the closer the inversion shading to these right columns, the higher the inversion quality). FIGS. 12B, 13B, 14B, 15B, 17B, 19B and 20B are horizontal resistivity Rh maps. The thin column/panel to the right of the respective Rh map correspond to the values used in the synthetic model (the closer the inversion shading to these right columns, the higher the inversion quality). In these figures, the stars correspond to the tool transmitter position, as it moves down (from the left to the right—each column represents inversion results for a given tool position). All the layer resistivities and anisotropy ratios below the stars are obtained by the look-ahead inversion. The bottom plot of FIGS. 12B, 13B, 14B, 15B, 17B, 19B and 20B shows the error of the anisotropy plus dip inversion and look-ahead inversion. The bottom plot of FIGS. 12A, 13A, 14A, 15A, 17A, 19A and 20A shows the estimated dip of the final look-around inversion with its uncertainty.

For each inversion, these figures display the actual formation which is utilized to find the formation ahead. One can now follow how the profile is coarsened behind the far receiver. The last layer, which displayed with a short 10 ft fade to white, is extended to infinity in the inversion.

The uncertainty of the look-ahead inversion is added to the Rh and R/Rh anisotropy ratio plots (fade to white for boundary uncertainty and alternating shading for Rh or anisotropy uncertainty).

The look-ahead interpretation using the full look-around-look-ahead workflow is compared to the hypothetical case of perfect non-directional propagation measurements, as if resistivity profile up to the last propagation tool measurement station is known exactly. If the perfect non-directional propagation measurements are triaxial, then that is a "perfect-Rt" case with complete information about all layer boundaries, resistivities, anisotropies, and dip. If the perfect non-directional propagation measurements are coaxial in vertical or low deviation wells, then that is a "perfect-Rh" case with information about the layer boundaries and horizontal resistivities, and unknown anisotropies.

Figure 12A:
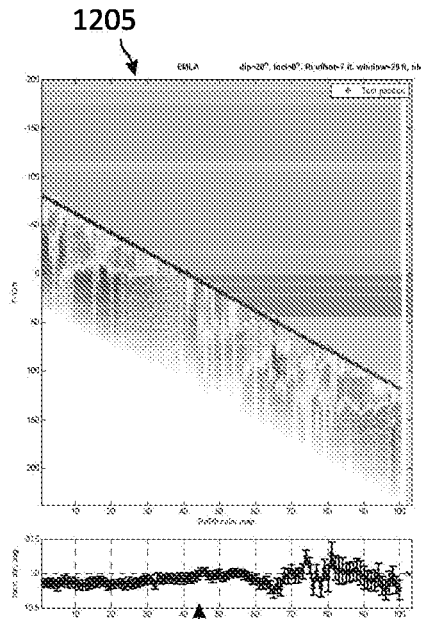
Figure 12B:
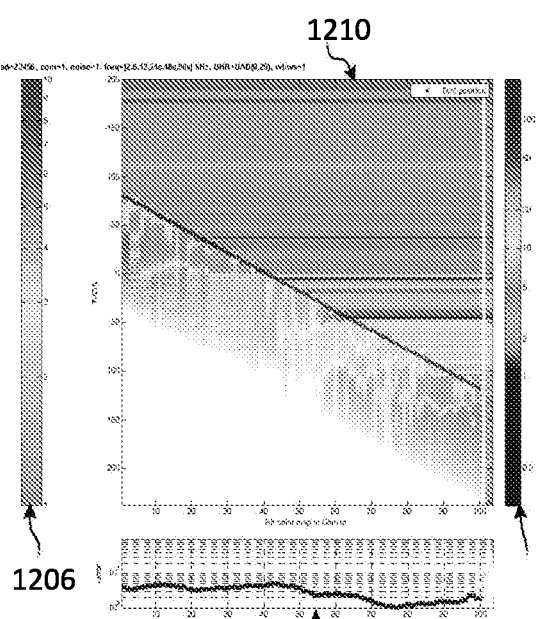
Figure 13A:
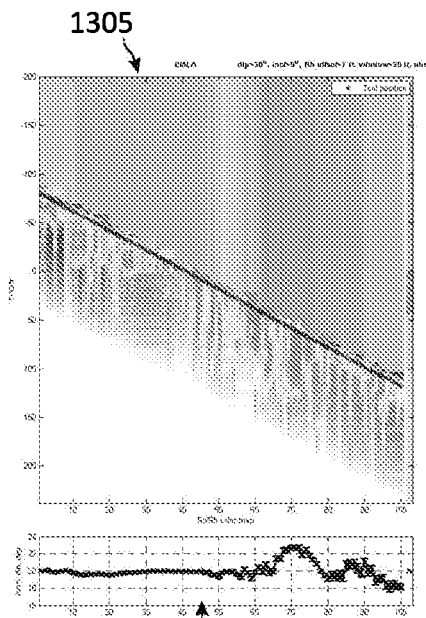
Figure 13B:
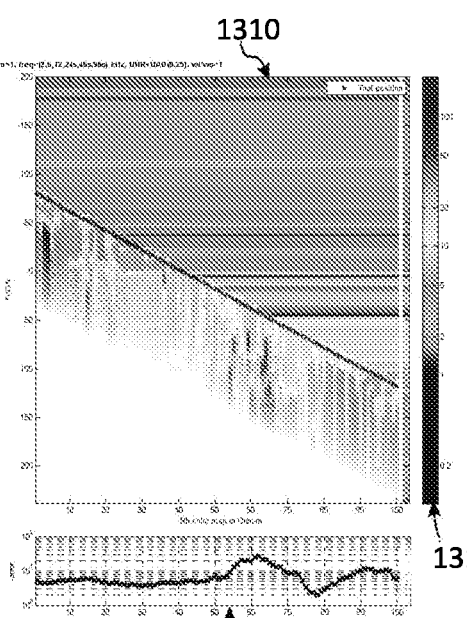

FIGS. 12A and 12B shows the inversion results and error for the "perfect-Rt case." FIGS. 13A and 13B shows the inversion results and error for the perfect-Rh case. Note that inversion error of the "perfect-Rh" case (FIGS. 13A and 13B) is up to one order of magnitude higher than the error of the "perfect-Rt" case (FIGS. 12A and 12B) when the anisotropy of the formation changes significantly within the look-ahead inversion window of the antennas (e.g., around inversion point 60 or 90 in the illustrated example). The quality of the look-ahead inversion reflects this error increase. In addition, although there are only small anisotropy variations in the conductive layers above zero feet TVD, the look-ahead capabilities and the estimation consistency of the formation ahead is reduced for "perfect-Rh" from inversion point 0 to 30 in the illustrated example. This shows that without a complete knowledge of the look-around formation (boundary, Rh, anisotropy and dip)—i.e., omitting some of this information (the anisotropy in this case) compromises the look-ahead inversion.

Figure 14A:
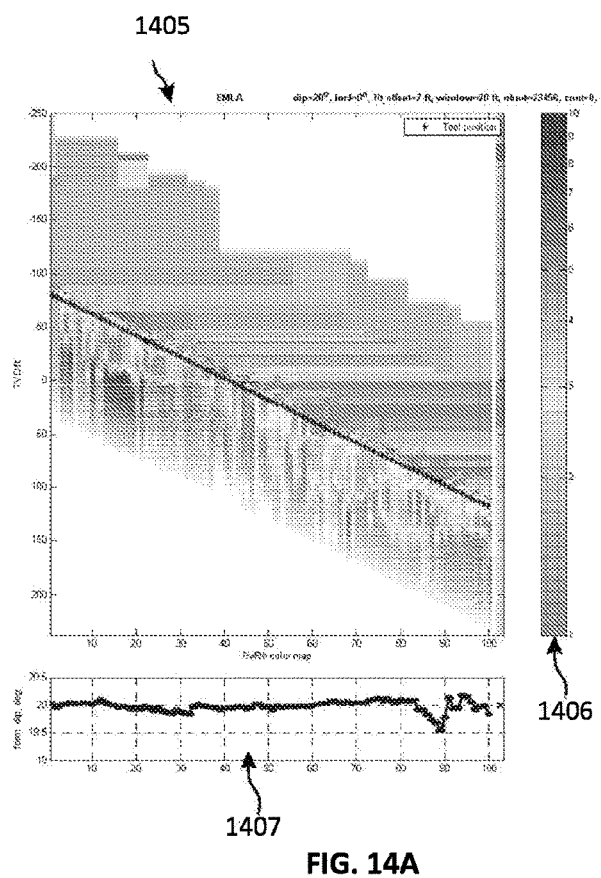
Figure 14B:
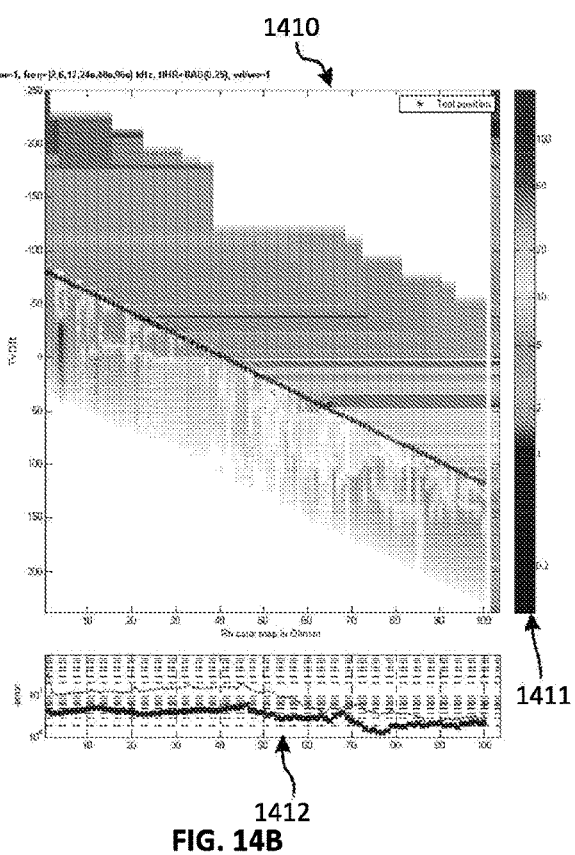
Figure 15A:
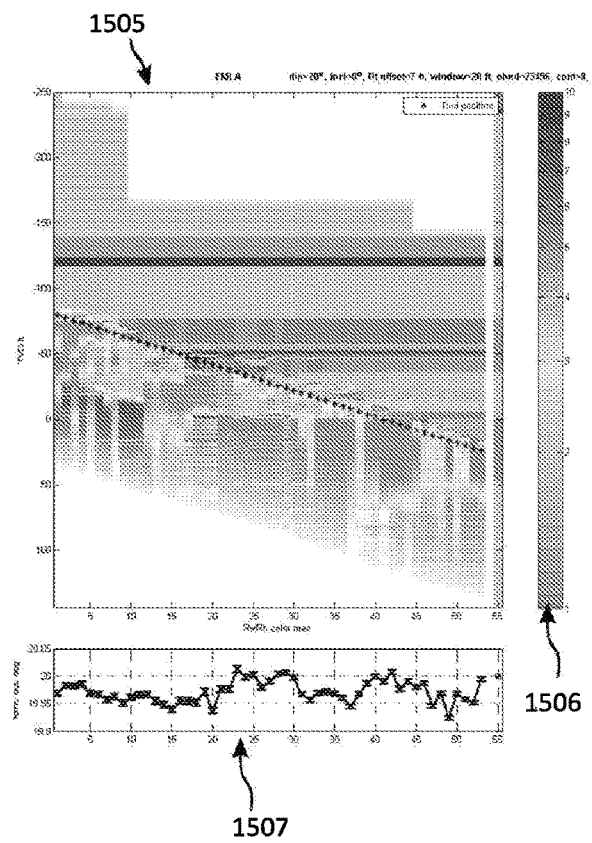
Figure 15B:
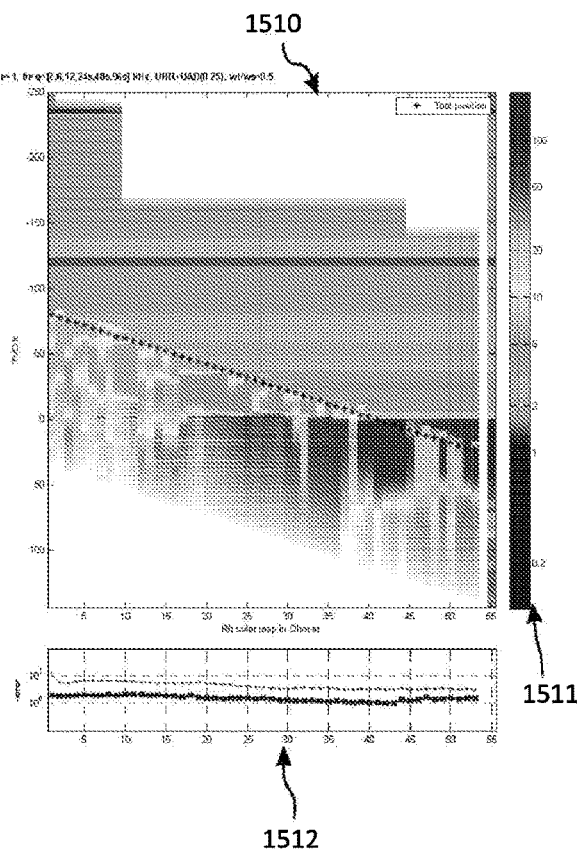

FIGS. 14A and 14B show the corresponding tracking plot using the full multistep inversion processing that characterizes the look-around zone. The anisotropy and dip are recovered well. The inversion quality and look-ahead capability is comparable to the "perfect-Rt" case as it only shows more highly uncertain thin layers than the "perfect-Rt" case. Consequently, the look-ahead inversion error of this is equal or only minimally higher than the error term of the "perfect-Rt" case look-ahead inversion in the illustrated example.

Figure 16:
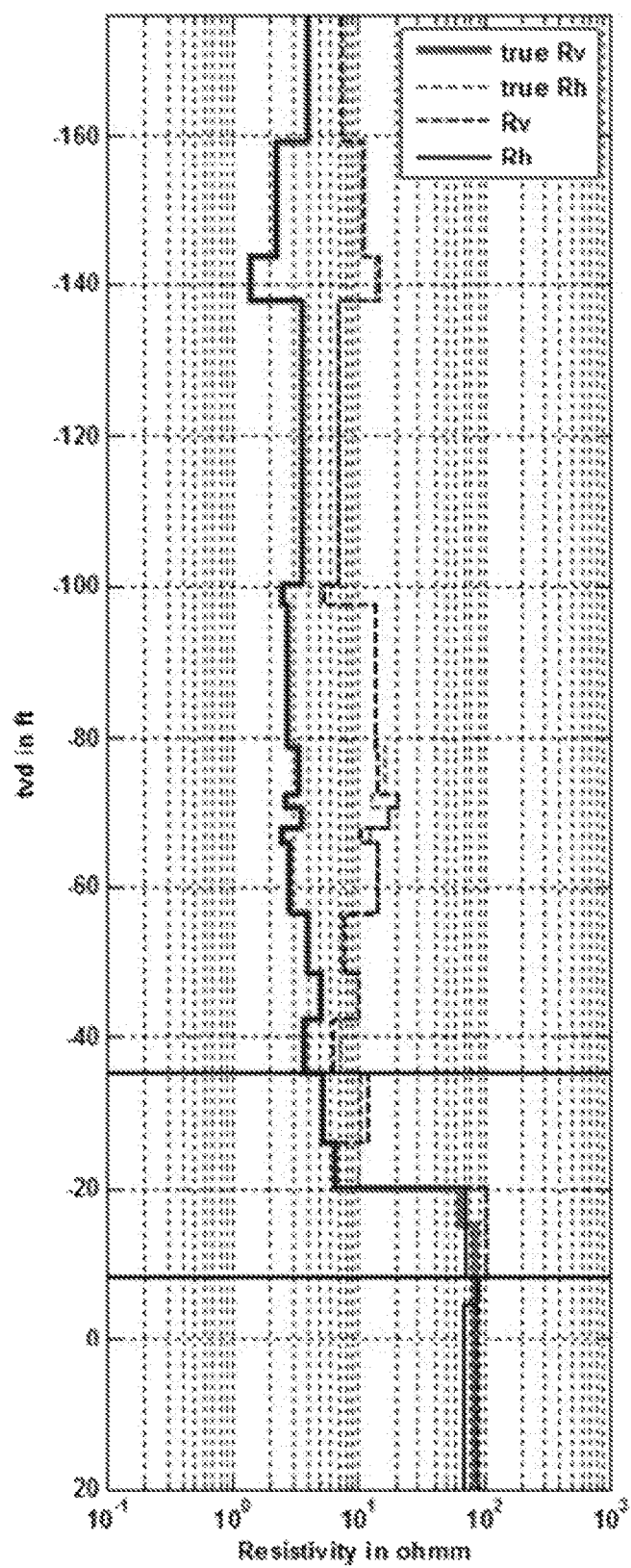
Figure 17A:
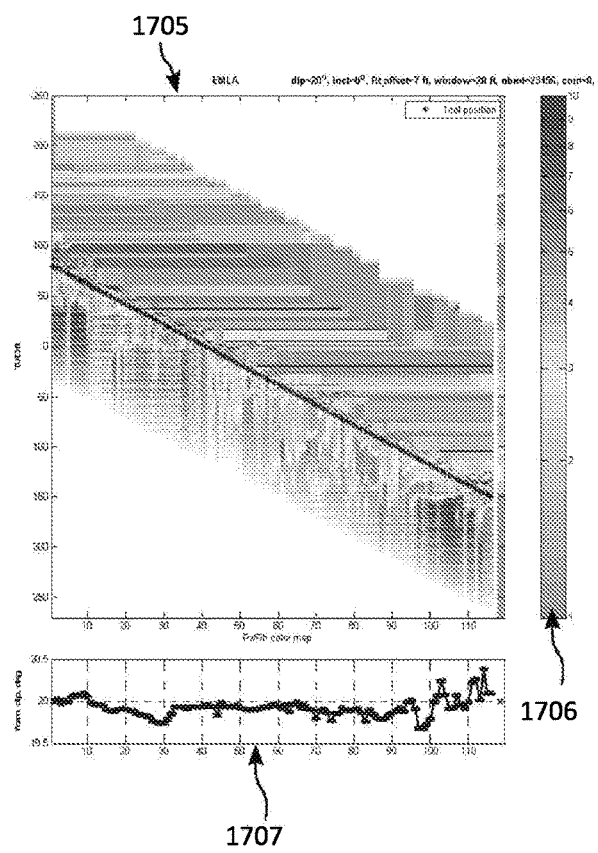
Figure 17B:
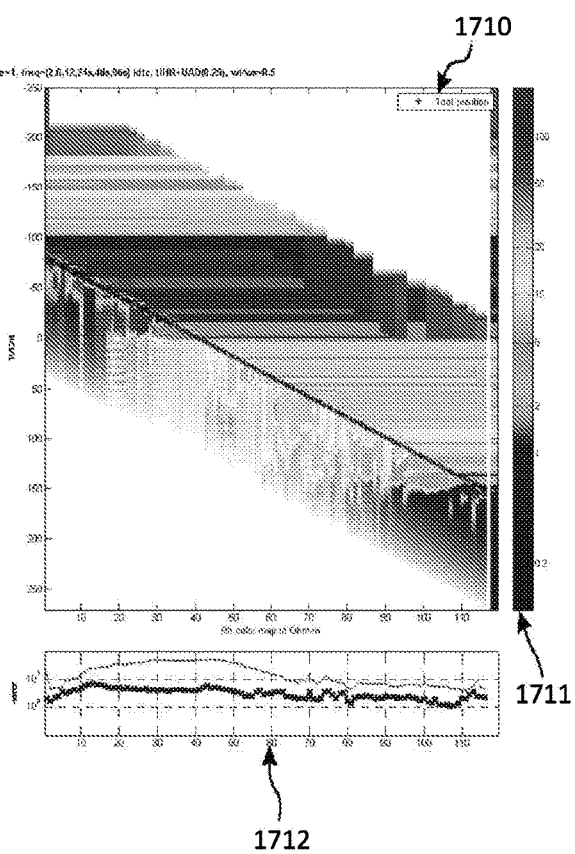
Figure 18:
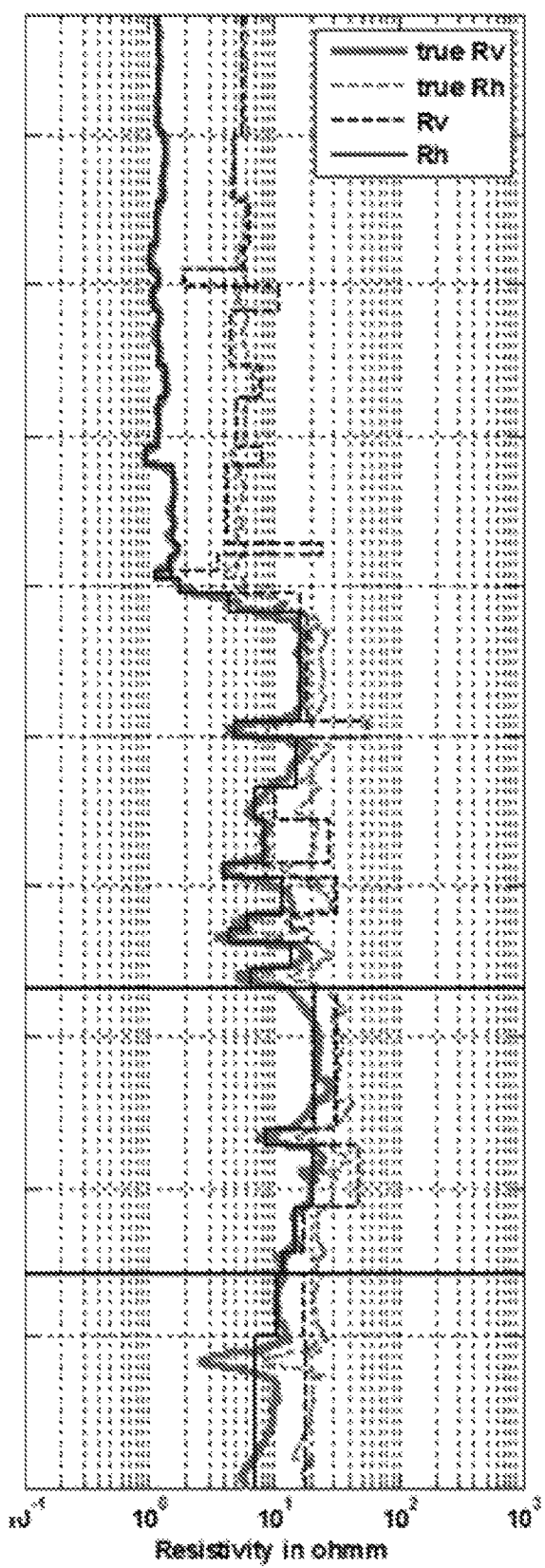
Figures 19A, 19B:
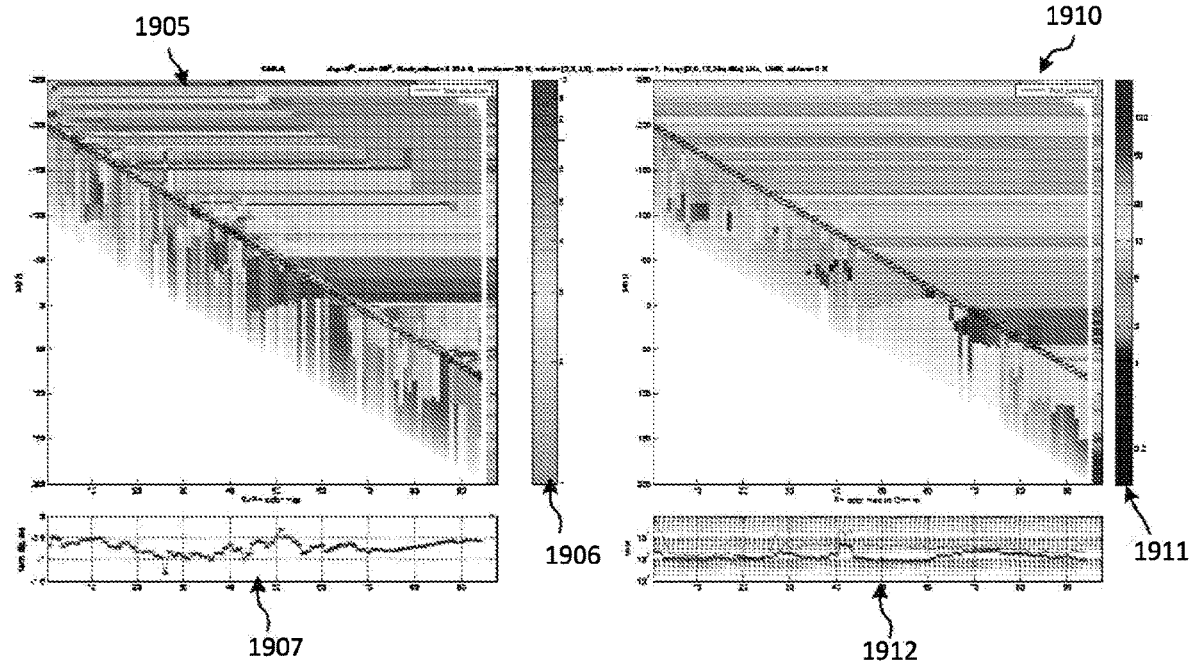
Figures 20A, 20B:
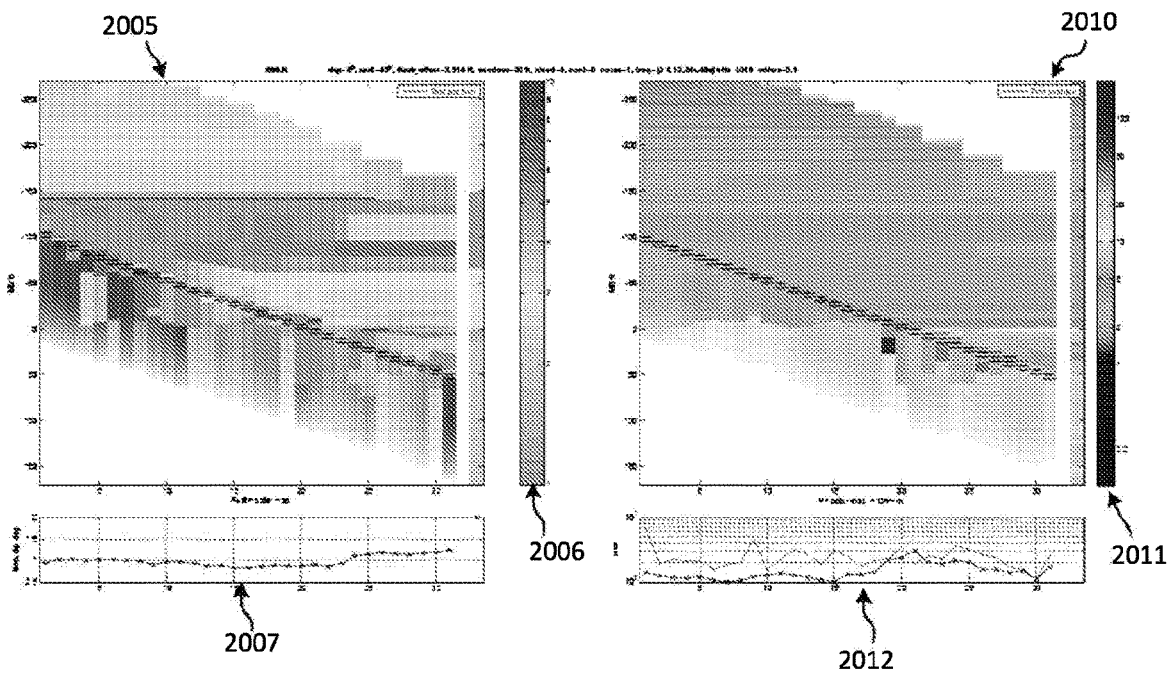

Two additional results are shown in FIGS. 15A-15B, 16, 17A-17B and 18. In both cases, the look-around inversion is able to reconstruct the formation the tool has crossed very well (boundaries, Rh, anisotropy and formation dip), leading to uncompromised look-ahead inversion results. FIG. 16 shows a sample comparison between the true profile and the look-around inversion derived profile (before coarsening behind Rx2) for the transmitter at +20 feet true vertical depth (TVD) (zero feet relative TVD in plot, formation below −7 feet TVD being the previous look-ahead result). FIG. 18 shows a sample comparison between the true resistivity profile and the look-around derived profile (before coarsening behind a distant receiver) for a transmitter at +100 ft true vertical depth (zero feet relative TVD in plot, formation below −7 feet TVD being the previous look-ahead result).

FIGS. 19A-19B and 20A-20B show two workflow results at high relative dip. Consequently, the workflow of FIG. 9 was used for these two examples. Again, the look-around inversion is able to accurately reconstruct the formation the tool has crossed (boundaries, Rh, anisotropy and formation dip).

Although conventional (co-axial antenna) shallow resistivity tools are provided in accordance with some examples, it should be understood that the algorithms and workflows described herein may be applied to handle full triaxial shallow resistivity measurements.

FIG. 21 shows an example computing system 2100 that can be used to implement the computer processing system 203 of FIG. 1A or parts thereof. The computing system 2100 can be an individual computer system 2101A or an arrangement of distributed computer systems. The computer system 2101A includes one or more analysis modules 2103 (a program of computer-executable instructions and associated data) that can be configured to perform various tasks according to some embodiments, such as the tasks described above. To perform these various tasks, an analysis module 1303 executes on one or more processors 2105, which is (or are) connected to one or more storage media 2107. The processor(s) 2105 is (or are) also connected to a network interface 2109 to allow the computer system 2101A to communicate over a data network 2111 with one or more additional computer systems and/or computing systems, such as 2101B, 2101C, and/or 2101D. Note that computer systems 2101B, 2101C and/or 2101D may or may not share the same architecture as computer system 2101A, and may be located in different physical locations.

The processor 2105 can include at least a microprocessor, microcontroller, processor module or subsystem, programmable integrated circuit, programmable gate array, digital signal processor (DSP), or another control or computing device.

The storage media 2107 can be implemented as one or more non-transitory computer-readable or machine-readable storage media. Note that while in the embodiment of FIG. 21, the storage media 2107 is depicted as within computer system 2101A, in some embodiments, storage media 2107 may be distributed within and/or across multiple internal and/or external enclosures of computing system 2101A and/or additional computing systems. Storage media 2107 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the computer-executable instructions and associated data of the analysis module(s) 2103 can be provided on one computer-readable or machine-readable storage medium of the storage media 2107, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 2100 is only one example of a computing system, and that computing system 2100 may have more or fewer components than shown, may combine additional components not depicted in the embodiment of FIG. 21, and/or computing system 2100 may have a different configuration or arrangement of the components depicted in FIG. 21. The various components shown in FIG. 21 may be implemented in hardware, software, or a combination of both hardware and software, including one or more signal processing and/or application specific integrated circuits.

Further, the operations of the computer processing system 203 as described herein may be implemented by running one or more functional modules in an information processing apparatus such as general purpose processors or application specific chips, such as ASICs, FPGAs, PLDs, SOCs, or other appropriate devices. These modules, combinations of these modules, and/or their combination with general hardware are all included within the scope of the disclosure.

In one embodiment, the operations of the computer processing system 2100 as described herein may be implemented by running one or more functional modules in an information processing apparatus (such as a workstation) located at or near the wellsite and/or in an information processing apparatus that is part of the BHA of the downhole tool.

In another embodiment, the operations of the computer processing system 203 as described herein may be implemented by running one or more functional modules in a cloud-based information processing apparatus.

The methods and processes described above such as, for example, modeling, plotting, analyzing, and/or control of any recited hardware, may be performed by a processing system. The processing system may include a single processor, multiple processors, or a computer system. Where the processing system includes multiple processors, the multiple processors may be disposed on a single device or on different devices at the same or remote locations relative to each other. The processor or processors may include one or more computer processors (e.g., a microprocessor, microcontroller, digital signal processor, or general purpose computer) for executing any of the methods and processes described above. The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Thus, the methods and processes described above may be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, Matlab, JAVA or other language or environment). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processing system may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Any of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language or a high-level language such as C, C++ or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

To the extent used in this description and in the claims, a recitation in the general form of "at least one of [a] and [b]" should be construed as disjunctive. For example, a recitation of "at least one of [a], [b], and [c]" would include [a] alone, [b] alone, [c] alone, or any combination of [a], [b], and [c].

Although a few example embodiments have been described in detail above, those skilled in the art will readily appreciate that many modifications are possible in the example embodiments without materially departing from embodiments disclosed herein. Accordingly, all such modifications are intended to be included within the scope of this disclosure.

What is claimed is:

1. A method of characterizing a geological formation traversed by a wellbore while drilling the wellbore using a resistivity tool in combination with a directional electromagnetic (EM) tool, the method comprising:
   operating the resistivity tool to acquire non-directional resistivity measurements of a look-around zone of the formation, and operating the directional electromagnetic tool to acquire directional EM measurements of the look-around zone of the formation and a look-ahead zone of the formation, wherein the electromagnetic tool comprises a transmitter subassembly that has a triaxial set of antennas comprising axial, tilted, and transverse antennas,
   determining a profile of the look-around zone by interpreting the non-directional resistivity measurements of the look-around zone and the directional EM measurements of the look-around zone, wherein the profile of the look-around zone characterizes at least formation dip as well as horizontal resistivity and vertical resistivity or resistivity anisotropy of one or more formation layers of the look-around zone; and
   determining a profile of the look-ahead zone by interpreting the directional EM measurements of the look-ahead zone, wherein the profile of the look-ahead zone characterizes at least formation dip as well as horizontal resistivity and vertical resistivity or resistivity anisotropy of one or more formation layers of the look-ahead zone, wherein interpretation of the directional EM measurements uses a formation model that is initialized according to values from the profile of the interpretation of the non-directional resistivity measurements.

2. The method of claim 1, further comprising:
   updating a reservoir model of the look-around zone based on the profile of the look-around zone.

3. The method of claim 1, further comprising:
   controlling operation of a drill bit based on the profile of the look-around zone.

4. The method of claim 1, further comprising:
   updating a reservoir model of the look-ahead zone based on the profile of the look-ahead zone.

5. The method of claim 1, further comprising:
   controlling operation of a drill bit based on the profile of the look-ahead zone.

6. The method of claim 1, wherein:
   the interpretation of the directional EM measurements of the look-around zone involves three distinct inversions, including a resistivity anisotropy inversion of directional EM measurements that are sensitive to variation in resistivity anisotropy of the look-around zone, a dip inversion of directional EM measurements that are sensitive to variation in formation dip of the look-around zone, and a resistivity anisotropy and dip inversion of directional EM measurements that are sensitive to variation in both resistivity anisotropy and formation dip of the look-around zone.

7. The method of claim 6, wherein:
   the resistivity anisotropy inversion uses a formation model of the look-around zone with a fixed formation dip and fixed horizontal resistivity for one or more formation layers of the look-around zone;
   the dip inversion uses a formation model of the look-around zone with a fixed horizontal resistivity and fixed vertical resistivity or resistivity anisotropy for one or more formation layers of the look-around zone; and
   the resistivity anisotropy and dip inversion uses a formation model of the look-around zone with a fixed horizontal resistivity for one or more formation layers of the look-around zone.

8. The method of claim 1, wherein:
   the interpretation of the directional EM measurements of the look-around zone involves a single inversion of EM measurements that are sensitive to variation in both formation dip and resistivity anisotropy of the look-around zone to solve for formation dip and resistivity anisotropy of the look-around zone.

9. The method of claim 1, wherein:
   the determination of the profile of the look-around zone involves interpreting the non-directional resistivity measurements of the look-around zone to estimate horizontal resistivity of one or more formation layers of the look-around zone, and interpreting the directional EM measurements of the look-around zone using the estimate of horizontal resistivity of one or more formation layers of the look-around zone to determine the profile of the look-around zone.

10. The method of claim 9, wherein:
    spatial resolution of the non-directional resistivity measurements of the resistivity tool have a higher resolution than the directional EM measurements of the directional electromagnetic tool.

11. The method of claim 1, wherein:
    the directional electromagnetic tool employs at least one tilted or transverse antenna in a transmitter sub and a receiver sub.

12. The method of claim 9, wherein:
    the interpretation of the non-directional resistivity measurements of the look-around zone involves inversion of such non-directional resistivity measurements, wherein the inversion uses a formation model that characterizes resistivity of one or more layers of the look-around zone.

13. The method of claim 12, wherein the formation model is initialized from at least one of:
    log-squaring of the non-directional resistivity measurements of the look-around zone;
    a profile of an earlier look-around zone; and
    a profile of an earlier look-ahead zone.

14. The method of claim 12, wherein:
    the inversion of the non-directional resistivity measurements of the look-around zone solves for the formation model that characterizes resistivity of one or more layers of the look-around zone;
    the solved-for formation model is upscaled to account for lower spatial resolution in the directional EM measurements of the look-around zone and look-ahead zone; and
    the upscaled formation model is used to define an initial formation model used in the interpretation of the directional EM measurements.

15. The method of claim 12, wherein:
    the inversion of the non-directional resistivity measurements of the look-around zone involves i) adjusting at least one of formation dip and resistivity anisotropy of one or more formation layers of the look-around zone, and ii) further adjusting horizontal resistivity of one or more formation layers of the look-around zone based on adjustment to one of formation dip and resistivity anisotropy of one or more formation layers of the look-around zone.

16. The method of claim 1, wherein:
the determination of the profile of the look-around zone involves inversion of the non-directional resistivity measurements of the look-around zone in combination with the directional EM measurements of the look-around zone.

17. The method of claim 1, wherein:
the interpretation of the directional EM measurements of the look-around zone employs a formation model that characterizes resistivity of one or more layers of the look-around zone.

18. The method of claim 17, wherein the formation model is initialized from at least one of:
log-squaring of the non-directional resistivity measurements of the look-around zone;
a profile of an earlier look-around zone; and
a profile of an earlier look-ahead zone.

19. The method of claim 17, wherein:
the formation model is initialized by coarsening a region outside a look-ahead inversion window.

20. The method of claim 1, wherein:
the interpretation of the directional EM measurements of the look-ahead zone involves inversion of the directional EM measurements of the look-ahead zone.

21. The method of claim 1, wherein:
the interpretation of the directional EM measurements of the look-ahead zone involves inversion operations that simultaneously solve for formation dip as well as horizontal resistivity and vertical resistivity or resistivity anisotropy of one or more formation layers of the look-ahead zone.

22. The method of claim 1, wherein:
the interpretation of the directional EM measurements of the look-ahead zone involves inversion operations that assume a fixed formation dip of the look-ahead zone and solve for horizontal resistivity and vertical resistivity or resistivity anisotropy of one or more formation layers of the look-ahead zone.

23. The method of claim 1, wherein:
the directional electromagnetic tool comprises at least one transmitter spaced from a plurality of receivers at both short and long spacings, wherein the least one transmitter is configurable to emit high frequency electromagnetic radiation at a number of different predefined frequencies.

24. A method of characterizing a geological formation traversed by a wellbore while drilling the wellbore using a resistivity tool and a directional electromagnetic (EM) tool, the method comprising:
operating the resistivity tool to acquire non-directional resistivity measurements of a look-around zone of the formation, and operating the electromagnetic tool to acquire directional EM measurements of a look-ahead zone of the formation;
determining a profile of the look-around zone by interpreting the non-directional resistivity measurements of the look-around zone, wherein the profile of the look-around zone characterizes at least formation dip as well as horizontal resistivity and vertical resistivity or resistivity anisotropy of one or more formation layers of the look-around zone; and
determining a profile of the look-ahead zone by interpreting the directional EM measurements of the look-ahead zone, wherein the profile of the look-ahead zone characterizes at least formation dip as well as horizontal resistivity and vertical resistivity or resistivity anisotropy of one or more formation layers of the look-ahead zone, wherein interpretation of the directional EM measurements uses a formation model that is initialized according to values from the profile of the interpretation of the non-directional resistivity measurements.

25. The method of claim 1, wherein:
the resistivity tool is selected from the group consisting of a propagation-type resistivity tool, a laterolog resistivity imaging tool, and a triaxial resistivity tool.

26. The method of claim 24, further comprising:
updating a reservoir model of the look-around zone based on the profile of the look-around zone.

27. The method of claim 24, further comprising:
controlling operation of a drill bit based on the profile of the look-around zone.

28. The method of claim 24, further comprising:
updating a reservoir model of the look-ahead zone based on the profile of the look-ahead zone.

29. The method of claim 24, further comprising:
controlling operation of a drill bit based on the profile of the look-ahead zone.

30. The method of claim 24, wherein:
the interpretation of the non-directional resistivity measurements of the look-around zone involves multiple distinct inversions of the non-directional resistivity measurements of the look-around zone.

31. The method of claim 24, wherein:
the interpretation of the non-directional resistivity measurements of the look-around zone involves a single inversion of the non-directional resistivity measurements of the look-around zone.

32. The method of claim 24, wherein:
the interpretation of the directional EM measurements of the look-ahead zone involves inversion operations that simultaneously solve for formation dip as well as horizontal resistivity and vertical resistivity or resistivity anisotropy of one or more formation layers of the look-ahead zone.

33. The method of claim 24, wherein:
the interpretation of the directional EM measurements of the look-ahead zone involves inversion operations that assume a fixed formation dip of the look-ahead zone and solve for horizontal resistivity and vertical resistivity or resistivity anisotropy of one or more formation layers of the look-ahead zone.

* * * * *